(12) United States Patent
Ding

(10) Patent No.: US 11,951,464 B2
(45) Date of Patent: Apr. 9, 2024

(54) MULTIMETALLIC NANOPARTICLES AND METHODS OF MAKING THEREOF

(71) Applicant: Kunlun Ding, Baton Rouge, LA (US)

(72) Inventor: Kunlun Ding, Baton Rouge, LA (US)

(73) Assignee: Board of Supervisors of Louisiana State University and Agricultural and Mechanical College, Baton Rouge, LA (US)

( * ) Notice: Subject to any disclaimer, the term of this patent is extended or adjusted under 35 U.S.C. 154(b) by 322 days.

(21) Appl. No.: 17/270,662

(22) PCT Filed: Aug. 21, 2019

(86) PCT No.: PCT/US2019/047373
§ 371 (c)(1),
(2) Date: Feb. 23, 2021

(87) PCT Pub. No.: WO2020/041392
PCT Pub. Date: Feb. 27, 2020

(65) Prior Publication Data
US 2021/0252494 A1    Aug. 19, 2021

Related U.S. Application Data

(60) Provisional application No. 62/721,690, filed on Aug. 23, 2018.

(51) Int. Cl.
| | | |
|---|---|---|
| *B01J 35/00* | (2006.01) | |
| *B01J 21/08* | (2006.01) | |
| *B01J 23/44* | (2006.01) | |
| *B01J 23/46* | (2006.01) | |
| *B01J 23/52* | (2006.01) | |
| *B01J 23/89* | (2006.01) | |
| *B01J 35/02* | (2006.01) | |
| *B01J 37/00* | (2006.01) | |
| *B01J 37/04* | (2006.01) | |
| *B01J 37/06* | (2006.01) | |
| *B01J 37/08* | (2006.01) | |
| *B01J 37/18* | (2006.01) | |
| *B01J 37/30* | (2006.01) | |

(52) U.S. Cl.
CPC ........... *B01J 35/0006* (2013.01); *B01J 21/08* (2013.01); *B01J 23/44* (2013.01); *B01J 23/462* (2013.01); *B01J 23/468* (2013.01); *B01J 23/52* (2013.01); *B01J 23/8906* (2013.01); *B01J 23/8913* (2013.01); *B01J 23/892* (2013.01); *B01J 23/8926* (2013.01); *B01J 35/023* (2013.01); *B01J 37/0063* (2013.01); *B01J 37/009* (2013.01); *B01J 37/04* (2013.01); *B01J 37/06* (2013.01); *B01J 37/082* (2013.01); *B01J 37/18* (2013.01); *B01J 37/30* (2013.01)

(58) Field of Classification Search
CPC ...... B01J 35/0006; B01J 35/023; B01J 21/08; B01J 23/44; B01J 23/462; B01J 23/468; B01J 23/52; B01J 23/8906; B01J 23/8913; B01J 23/892; B01J 23/8926
See application file for complete search history.

(56) References Cited

U.S. PATENT DOCUMENTS

| | | | |
|---|---|---|---|
| 6,969,693 B2 * | 11/2005 | Sauvage | ................. C07C 41/06 |
| | | | 502/169 |
| 7,850,933 B2 | 12/2010 | Yang | |
| 2017/0260083 A1 * | 9/2017 | Grandjean | ......... B01D 67/0079 |
| 2018/0208790 A1 | 7/2018 | McCullough | |

FOREIGN PATENT DOCUMENTS

CN          105680054         6/2016

OTHER PUBLICATIONS

Wong et al., Science, (2017), V.358, p. 1427-1430. (Disclosed in IDS).*
J. P. Brunelle, Pure & Appl. Chem., (1978), v.50, p. 1211-1229.*
Alexeev, O. S., & Gates, B. C. (2003). Supported Bimetallic Cluster Catalysts. Industrial & Engineering Chemistry Research, 42(8), 1571-1587.
Alonso, D. M., Wettstein, S. G., & Dumesic, J. A. (2012). Bimetallic catalysts for upgrading of biomass to fuels and chemicals. Chemical Society Reviews, 41(24), 8075.
Bu, L., Zhang, N., Guo, S., Zhang, X., Li, J., Yao, J., . . . Huang, X. (2016). Biaxially strained PtPb/Pt core/shell nanoplate boosts oxygen reduction catalysis. Science, 354(6318), 1410-1414.
Ding, K et al., "A general synthesis approach for supported bimetallic nanoparticles via surface inorganic chemistry", Science, (Nov. 2, 2018), vol. 362, pp. 560-564, XP055688144.
Sankar, M., Dimitratos, N., Miedziak, P. J., Wells, P. P., Kiely, C. J., & Hutchings, G. J. (2012). Designing bimetallic catalysts for a green and sustainable future. Chemical Society Reviews, 41(24), 8099.
Sinfelt, J. H. (1987). Structure of bimetallic clusters. Accounts of Chemical Research, 20(4), 134-139.

(Continued)

*Primary Examiner* — Yong L Chu
(74) *Attorney, Agent, or Firm* — Riverside Law LLP

(57) ABSTRACT

The present invention relates in part to a method of fabricating multimetallic nanoparticles, the method comprising the steps of providing a substrate; activating the substrate surface; adsorbing a cationic transition metal complex onto the substrate surface to form a substrate-supported cationic transition metal complex; adsorbing an anionic transition metal complex onto the substrate-supported cationic transition metal complex to form a substrate-supported multimetallic complex salt; and reducing the substrate-supported multimetallic complex salt to provide a plurality of multimetallic nanoparticles. The invention also relates in part to a composition of multimetallic nanoparticles comprising at least two metals $M_a$ and $M_b$; wherein the ratio of $M_a$ to $M_b$ is between about 2:1 and about 1:2.

14 Claims, 26 Drawing Sheets

(56) References Cited

OTHER PUBLICATIONS

Toshima, N., & Yonezawa, T. (1998). Bimetallic nanoparticles-novel materials for chemical and physical applications. New Journal of Chemistry, 22(11), 1179-1201.
Wong, A et al., "Synthesis of ultrasmall, homogeneously alloyed, bimetallic nanoparticles on silica supports", Science, (Dec. 15, 2017), vol. 358, pp. 1427-1430, XP055688141.

* cited by examiner

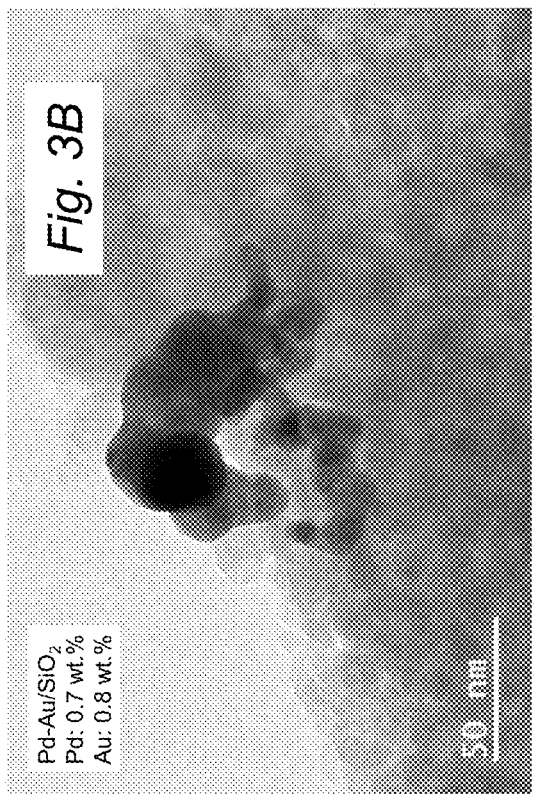
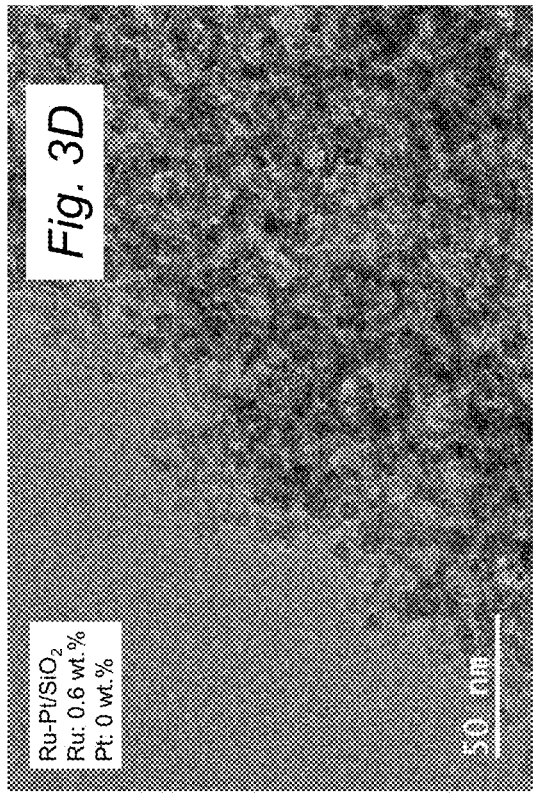
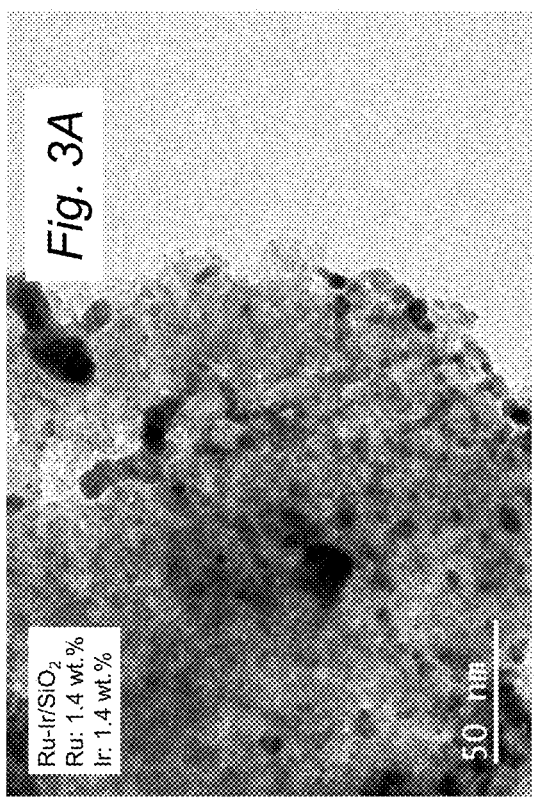
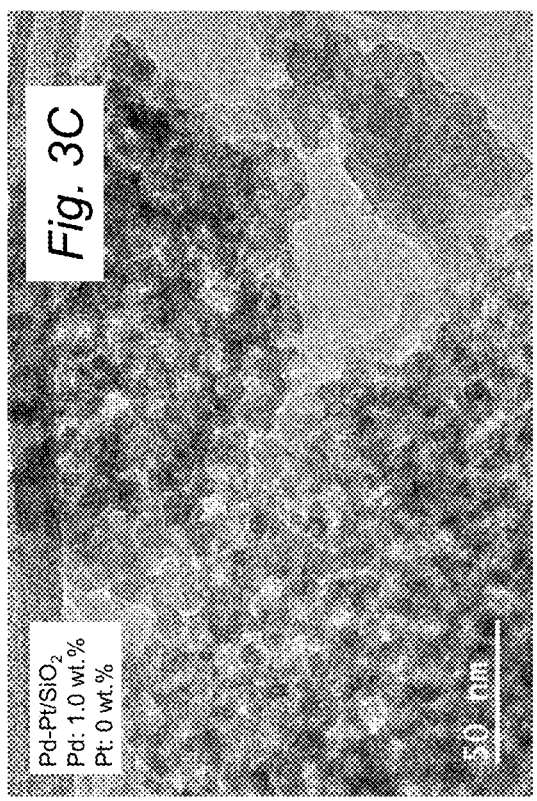

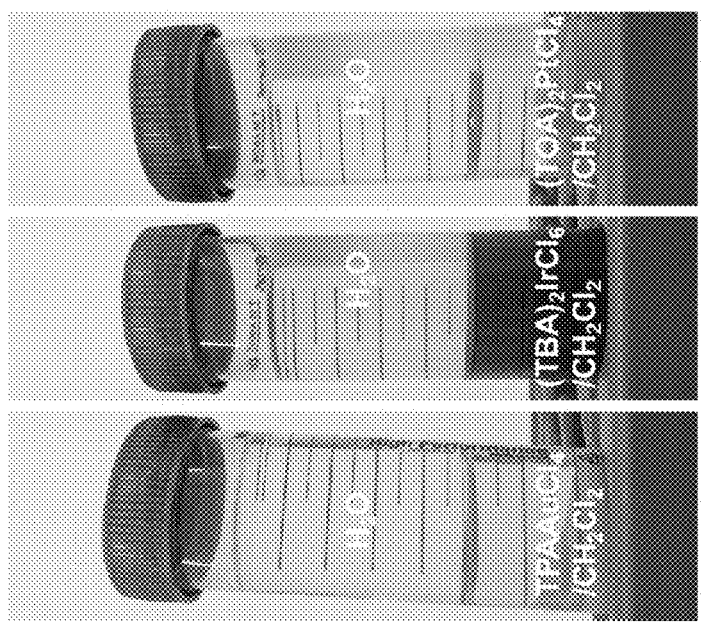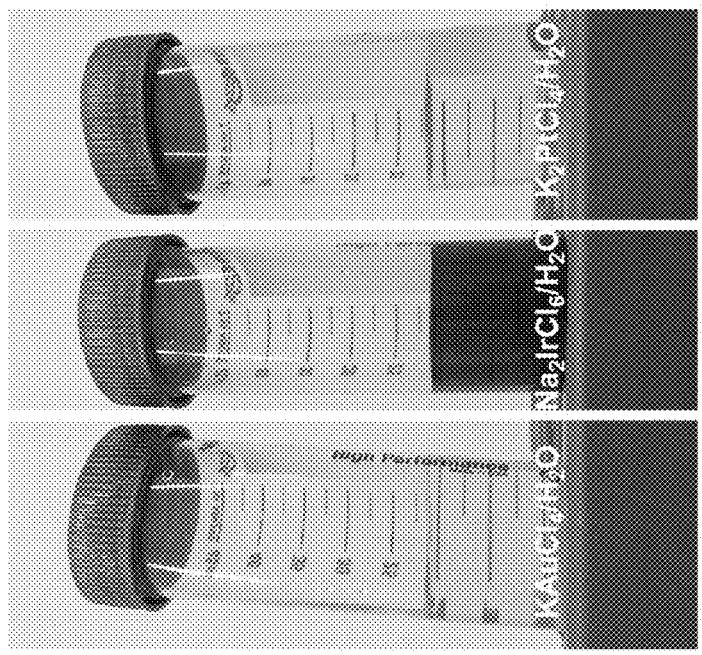
Fig. 4

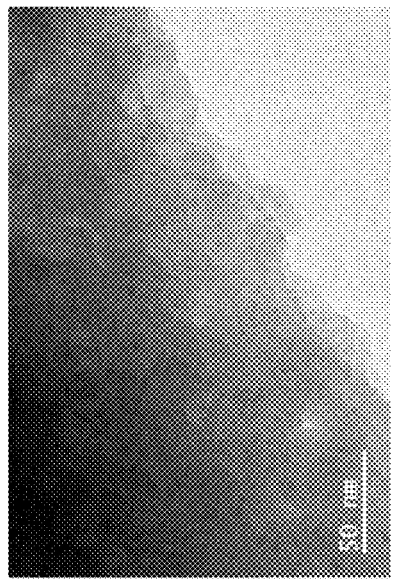
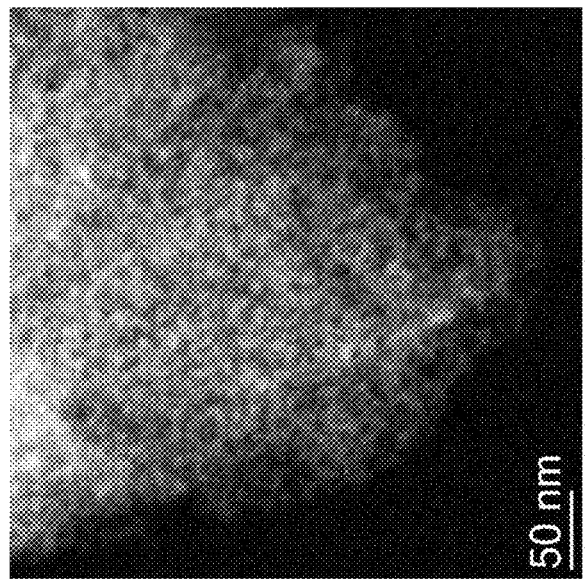
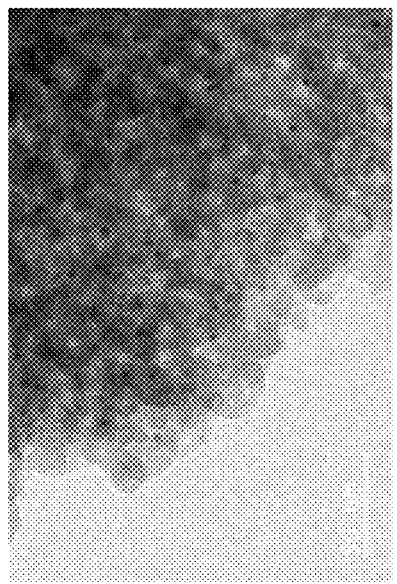
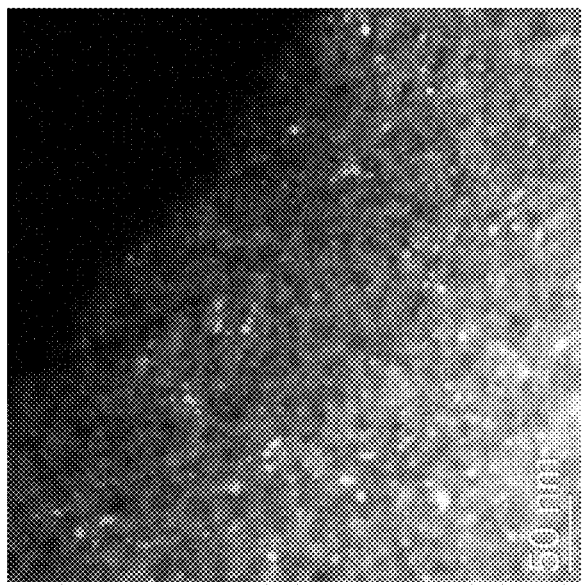
Fig. 9

MULTIMETALLIC NANOPARTICLES AND METHODS OF MAKING THEREOF

CROSS-REFERENCE TO RELATED APPLICATIONS

The present application is a 35 U.S.C. § 371 national phase application from, and claiming priority to, International Application PCT/US2019/047373, filed Aug. 21, 2019, which claims priority under 35 U.S.C. § 119(e) to U.S. Provisional Application Ser. No. 62/721,690, filed Aug. 23, 2018, all of which applications are incorporated herein by reference in their entireties.

BACKGROUND OF THE INVENTION

Bimetallic nanoparticles (NPs) constitute a significant part in heterogeneous catalysts and are of great importance to many petrochemical processes, including reforming (Sinfelt, Acc. Chem. Res, 1987, 20, 134-139), selective hydrogenation (Kyriakou et al., Science 335, 1209-1212 (2012); Studt et al., Science, 2008, 320, 1320-1322) dehydrogenation (Sattler, et al., Chem. Rev., 2014, 114, 10613-10653), acetoxylation (Chen, et al., Science, 2005, 310, 291-293), and other processes. In recent years, bimetallic NPs have been employed in biomass conversions (Alonso, et al., Chem. Soc. Rev., 2012, 41, 8075-8098), electrocatalysis (Lim et al., Science, 2009, 324, 1302-1305; Chen et al., Science, 2014, 343, 1339-1343; Huang et al., Science, 2015, 348, 1230-1234; Bu et al., Science, 2016, 354, 1410-1414), and many other catalytic processes (Edwards et al., Science, 2009, 323, 1037-1041; Freakley et al., Science, 2016, 351, 965-968; Agarwal et al., Science, 2017, 358, 223-226). The catalytic properties of bimetallic NPs are often significantly different from their parent metals, which are mostly originated from their distinct geometric and electronic structures as well as the synergistic effects between the two metals (Alonso, et al., Chem. Soc. Rev., 2012, 41, 8075-8098; Toshima and Yonezawa, New J. Chem., 1998, 22, 1179-1201; Ferrando, et al., Chem. Rev., 2008, 108, 845-910; Sankar et al., Chem. Soc. Rev., 2012, 41, 8099-8139). In particular, synthetic protocols have been demonstrated crucial to the structural, electronic, and hence catalytic performance of bimetallic NPs. Conventional impregnation method usually results in ill-defined bimetallic NPs with inhomogeneous particle sizes and compositions (Alexeev and Gates, Ind. Eng. Chem. Res., 2003, 42, 1571-1587; Wong, et al., Science, 2017, 358, 1427-1430).

Over the past few decades, tremendous efforts have been devoted to the development of new strategies for the synthesis of bimetallic NPs, including colloidal synthesis (Gilroy, et al., Chem. Rev., 2016, 116, 10414-10472), surface organometallic chemistry (Candy, et al., J. Mol. Catal., 1994, 86, 179-204), atomic layer deposition (Lu et al., Nat. Commun., 2014, 5, 3264), coadsorption and coreduction of metal cations (Wong, et al., Science, 2017, 358, 1427-1430), and carbothermal shock synthesis (Yao et al., Science, 2018, 359, 1489-1494). Nevertheless, grand challenges still remain in the synthesis of ultra-small supported bimetallic NPs with well-defined stoichiometry and intimacy between constituent metals.

There remains a need in the art for multimetallic nanoparticles and methods of making thereof. This invention addresses this unmet need.

SUMMARY OF THE INVENTION

In one aspect, the present invention relates to a method of fabricating multimetallic nanoparticles, the method comprising the steps of providing a substrate; activating the substrate surface; adsorbing a cationic transition metal complex onto the substrate surface to form a substrate-supported cationic transition metal complex; adsorbing an anionic transition metal complex onto the substrate-supported cationic transition metal complex to form a substrate-supported multimetallic complex salt; and reducing the substrate-supported multimetallic complex salt to provide a plurality of multimetallic nanoparticles. In one embodiment, the step of activating the substrate surface comprises the step of treating the substrate surface with a base. In one embodiment, the substrate has a specific surface area above about 500 $m^2/g$.

In one embodiment, the charge of the cationic transition metal complex is an integer value between +2 and +4. In one embodiment, the cationic transition metal complex is a polyamine complex. In one embodiment, the step of adsorbing a cationic transition metal complex onto the substrate surface comprises the step adding an aqueous solution comprising the cationic transition metal complex to an aqueous suspension comprising the substrate.

In one embodiment, the anionic transition metal complex is selected from the group consisting of $Na_2PtCl_4$, $K_2PtCl_4$, $Na_2IrCl_6$, $K_2IrCl_6$, $NaAuCl_4$, and $KAuCl$. In one embodiment, the molar ratio of cationic transition metal complex to anionic transition metal complex is about 1:1. In one embodiment, the step of adsorbing an anionic transition metal complex onto the substrate-supported cationic transition metal complex further comprises the steps of: preparing an aqueous solution of the anionic transition metal complex; adding a phase transfer agent to the aqueous solution; adding an aprotic solvent to the aqueous solution to form a biphasic mixture; separating the aprotic solvent from the biphasic mixture; and adding the aprotic solvent to a suspension of the substrate-supported cationic transition metal complex in an aprotic solvent. In one embodiment, the aprotic solvent is selected from the group consisting of a chlorinated solvent, an aromatic solvent, and an aliphatic solvent. In one embodiment, the phase transfer agent is a quaternary ammonium salt or a crown ether. In one embodiment, the step of reducing the substrate-supported multimetallic complex salt comprises the step of treating the substrate-supported multimetallic complex salt with an atmosphere comprising hydrogen gas at a temperature of about 400° C.

In one embodiment, the step of adsorbing an anionic transition metal complex onto the substrate-supported cationic transition metal complex to form a substrate-supported multimetallic complex salt further comprises the step of: adsorbing a second cationic transition metal complex onto the anionic transition metal complex. In one embodiment, the step of adsorbing a second cationic transition metal complex onto the anionic transition metal complex further comprises the steps of exchanging at least one counterion of the second cationic transition metal complex with a non-coordinative anion; and adding the second cationic transition metal complex to a suspension of the substrate in an aprotic solvent.

In another aspect, the present invention relates to a composition of multimetallic nanoparticles comprising: at least two metals $M_a$ and $M_b$; wherein the ratio of $M_a$ to $M_b$ is between about 2:1 and about 1:2. In one embodiment, the composition further comprises a solid support comprising carbon or one or more oxides of silicon, aluminum, niobium, tantalum, titanium, zirconium, cerium, or tin. In one embodiment, $M_a$ is selected from the group consisting of Pt, Pd, Fe, Co, Ni, and Cu. In one embodiment, $M_b$ is selected from the group consisting of Ir, Pt, and Au. In one embodiment, the composition further comprises metal $M_c$, wherein $M_c$ is selected from the group consisting of Pt, Pd, Fe, Co, Ni, and Cu.

BRIEF DESCRIPTION OF THE DRAWINGS

The following detailed description of preferred embodiments of the invention will be better understood when read in conjunction with the appended drawings. For the purpose of illustrating the invention, there are shown in the drawings embodiments which are presently preferred. It should be understood, however, that the invention is not limited to the precise arrangements and instrumentalities of the embodiments shown in the drawings.

FIGS. 3A to 3D depict TEM images of metallic NPs synthesized by sequential adsorption of complex metal cations and anions in water and reduced at 400° C. Metal loadings were analyzed by EDS. FIG. 3A is a TEM image of Ru—Ir/$SiO_2$. FIG. 3B is a TEM image of Pd—Au/$SiO_2$. FIG. 3C is a TEM image of Pd—Pt/$SiO_2$. FIG. 3D is a TEM image of Ru—Pt/$SiO_2$.

FIG. 4 depicts photographs of the phase transfer process of complex metal anions.

FIG. 9 depicts TEM and HAADF-STEM images of Pd—Pt/$SiO_2$ and Ru—Pt/$SiO_2$ synthesized by sequential electrostatic adsorption and reduced at 400° C.

FIG. 24A is a plot of temperature-dependent acetylene conversion. FIG. 24B is a plot of ethane selectivity as a function of acetylene conversion. FIG. 24C depicts IR spectra of CO adsorbed on Pt/$SiO_2$, Pd/$SiO_2$, and Pt—Pt/$SiO_2$. FIG. 24D depicts IR spectra of CO adsorbed on Ir/$SiO_2$, Pd/$SiO_2$, and Pd—Ir/$SiO_2$.

DETAILED DESCRIPTION

The present invention relates in part to the unexpected discovery that substrate-supported heterometallic multicomplex salts are effective precursors to multimetallic nanoparticles.

Definitions

It is to be understood that the figures and descriptions of the present invention have been simplified to illustrate elements that are relevant for a clear understanding of the present invention, while eliminating, for the purpose of clarity, many other elements found in the art related to nanoparticle production and the like. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined otherwise, all technical and scientific terms used herein have the same meaning as commonly understood by one of ordinary skill in the art to which this invention belongs. Although any methods, materials and components similar or equivalent to those described herein can be used in the practice or testing of the present invention, the preferred methods, and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±10%, or ±0.10% from the specified value, as such variations are appropriate.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, 6 and any whole and partial increments therebetween. This applies regardless of the breadth of the range.

Methods of the Invention

Figure 1:
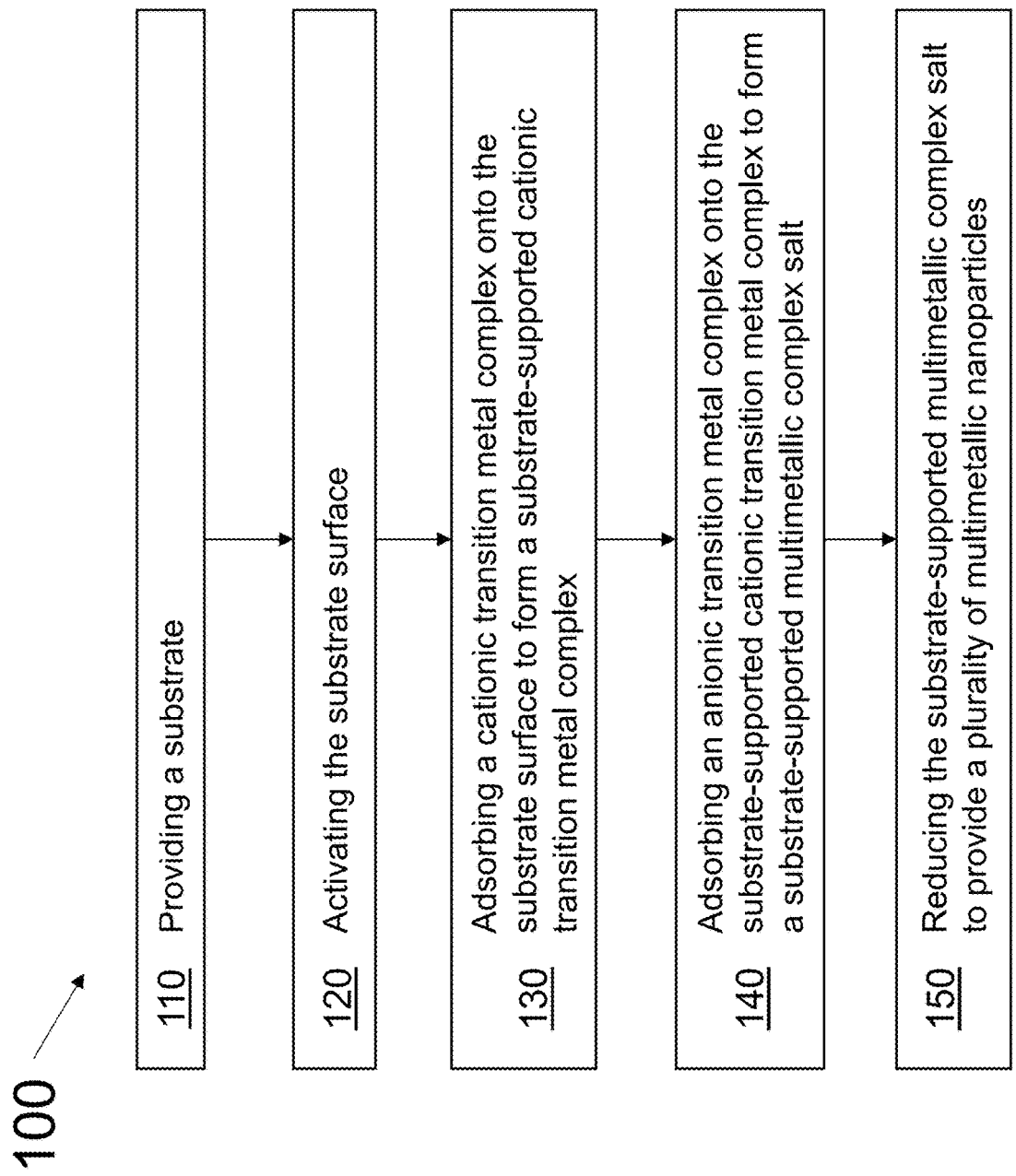
FIG. 1 outlines an exemplary method of the present invention.

In one aspect, the present invention relates in part to a method of fabricating multimetallic nanoparticles. Exemplary method 100 is provided in FIG. 1. In step 110, a substrate is provided. In step 120, the surface of the substrate is activated. In step 130, a cationic transition metal complex is adsorbed onto the substrate surface to form a substrate-supported cationic transition metal complex. In step 140, an anionic transition metal complex is adsorbed onto the substrate-supported cationic transition metal complex to form a substrate-supported multimetallic complex salt. In step 150, the substrate-supported multimetallic complex salt is reduced to provide a plurality of multimetallic nanoparticles.

In one embodiment, the substrate in step 110 is mesoporous. In one embodiment, the substrate comprises macropores, mesopores, and/or micropores. In one embodiment, the substrate comprises one or more oxides of silicon, aluminum, niobium, tantalum, titanium, zirconium, cerium, or tin. In one embodiment, the substrate comprises silica. In one embodiment, the substrate comprises alumina. In one embodiment, the substrate comprises carbon. In one embodiment, the solid substrate comprises activated carbon.

In one embodiment, the substrate comprises surface hydroxyl groups. Exemplary substrates having surface hydroxyl groups include, but are not limited to, silicon oxide, titanium oxide, aluminum oxide, tantalum oxide, hafnium oxide, zirconium oxide, titanium aluminate, titanium silicate, hafnium aluminate, hafnium silicate, zirconium aluminate, and zirconium silicate. The substrate may be formed using any method known in the art.

In one embodiment, the substrate is porous. In one embodiment, the substrate is a zeolite. Exemplary zeolites include, but are not limited to, faujasites, such as zeolites X and Y, mordenite, zeolite beta, ZSM-3, ZSM-5, ZSM-11, ZSM-12, ZSM-18, ZSM-20, ZSM-34, ZSM-38, ZSM-48, ferrierite, gmelinite, zeolite L, zeolite omega, offretite, NU-87, MCM-22, MCM-41, MCM-48, MCM-36, MCM-56, SSZ-24, Ni—Y, Ni—X, Ni-Beta, SBA-15, ETS-10, ETAS-10, ETBS-10, ETGS-10, TS-1, MFI, MEL, MTW, EUO, MTT, HEU, FER, TON, CHA, ERI, KFI, LEV, and LTA, ZK-4, ZK-5, zeolite A, zeolite T, clinoptilolite, chabazite and erionite.

In one embodiment, the substrate has a specific surface area above about 10 $m^2/g$. In one embodiment, the specific surface area is above about 100 $m^2/g$. In one embodiment, the specific surface area is above about 200 $m^2/g$. In one embodiment, the specific surface area is above about 300 $m^2/g$. In one embodiment, the specific surface area is above about 400 $m^2/g$. In one embodiment, the specific surface area is above about 500 $m^2/g$. In one embodiment, the specific surface area is above about 600 $m^2/g$. In one embodiment, the specific surface area is above about 700 $m^2/g$. In one embodiment, the specific surface area is above about 800 $m^2/g$. In one embodiment, the specific surface area is above about 900 $m^2/g$. In one embodiment, the specific surface area is above about 1000 $m^2/g$. In one embodiment, the specific surface area is about 1000 $m^2/g$.

In one embodiment, the substrate has a total pore volume above about 0.1 ml/g. In one embodiment, the total pore volume includes macropores, mesopores, and micropores. In one embodiment, the total pore volume is above about 0.25 ml/g. In one embodiment, the total pore volume is above about 0.5 ml/g. In one embodiment, the total pore volume is above about 1 ml/g. In one embodiment, the total pore volume is above about 1.0 ml/g. In one embodiment, the total pore volume is above about 1.5 ml/g. In one embodiment, the total pore volume is above about 2.0 ml/g. In one embodiment, the total pore volume is above about 2.5 ml/g. In one embodiment, the total pore volume is above about 3.0 ml/g. In one embodiment, the total pore volume is above about 3.5 ml/g. In one embodiment, the total pore volume is above about 4.0 ml/g. In one embodiment, the total pore volume is above about 4.5 ml/g. In one embodiment, the total pore volume is above about 5.0 ml/g. In one embodiment, the total pore volume is above about 6.0 ml/g. In one embodiment, the total pore volume is above about 7.0 ml/g. In one embodiment, the total pore volume is above about 8.0 ml/g. In one embodiment, the total pore volume is above about 9.0 ml/g. In one embodiment, the total pore volume is above about 10.0 ml/g. In one embodiment, the total pore volume is about 5.0 ml/g. In one embodiment, the total pore volume is about 10 ml/g.

In one embodiment, the step of activating the substrate surface (step 120 of exemplary method 110 in FIG. 1) comprises the step of treating the substrate surface with a base. In one embodiment, the substrate surface is treated with an aqueous solution of base to form an activated substrate surface. In one embodiment, the activated surface is washed with water following surface treatment. In one embodiment, the activated surface is washed 1, 2, 3, 4, 5, 6, 7, 8, 9, or 10 times with water following surface activation. In one embodiment, the activated substrate surface has exposed hydroxyl groups. In one embodiment, the substrate surface is neutral prior to activation. In one embodiment, the activated substrate surface has an overall negative charge after activation. The base can be any base known to those of skill in the art. Exemplary bases include, but are not limited to, hydroxides, alkoxides, bicarbonates, phosphates and carbonates of alkali or alkaline earth metals; ammonia, collidine, trimethylamine, triethylamine, tributylamine, diisopropylethylamine, N-methylmorpholine, 1-alkylimidazole and 1,8-diazabicyclo[5.4.0]undec-7-ene (DBU). Specific bases are aqueous ammonia, potassium phosphate, sodium hydroxide, calcium hydroxide, magnesium hydroxide, potassium hydroxide, sodium carbonate, potassium carbonate, sodium bicarbonate, potassium bicarbonate, sodium tert-butoxide, sodium isopropoxide, potassium tert-butoxide, or combinations thereof.

In one embodiment, the cationic transition metal complex comprises a transition metal coordination complex with an overall positive charge. In one embodiment, the cationic transition metal complex comprises a transition metal atom having a positive oxidation state and one or more ligands, such that the overall formal charge of the coordination complex is positive. Exemplary transition metal atoms include, but are not limited to, Ti, V, Cr, Mn, Fe, Co, Ni, Cu, Zn, Zr, Nb, Mo, Tc, Ru, Rh, Pd, Ag, Cd, Hf, Ta, W, Re, Os, Ir, Pt, Au, and Hg. In one embodiment, the anionic transition metal complex comprises one or more water atoms. In one embodiment, the cationic transition metal complex comprises more than one type of transition metal.

In one embodiment, the cationic transition metal complex further comprises a non-coordinating anionic counterion. Exemplary anionic counterions include, but are not limited to, halide anions (e.g., $F^-$, $Cl^-$, $Br^-$, and $I^-$), $NO_3^-$, $ClO_4^-$, $OH^-$, $H_2PO_4^-$, $HSO_4^-$, $SO_4^{-2}$, sulfonate anions (e.g., methanesulfonate, trifluoromethanesulfonate, p-toluenesulfonate, benzenesulfonate, 10-camphor sulfonate, naphthalene-2-sulfonate, naphthalene-1-sulfonic acid-5-sulfonate, ethan-1-sulfonic acid-2-sulfonate, and the like), and carboxylate anions (e.g., acetate, ethanoate, propanoate, benzoate, glycerate, lactate, tartrate, glycolate, and the like).

In one embodiment, the charge of the cationic transition metal complex is an integer value between +2 and +4. In one embodiment, the charge of the cationic transition metal complex is +2. In one embodiment, the charge of the cationic transition metal complex is +3. In one embodiment, the charge of the cationic transition metal complex is +4.

In one embodiment, the cationic transition metal complex is a polyamine complex. In one embodiment, the cationic transition metal complex is selected from the group consisting of $Pd(NH_3)_4Cl_2$, $Ru(NH_3)_6Cl_2$, $Fe(NH_3)_6Cl_3$, $Co(NH_3)_6Cl_3$, $Ni(NH_3)_6Cl_2$, $Cu(NH_3)_4Cl_2$, and $Cu(NH_3)_4SO_4$.

In one embodiment, the cationic transition metal complex comprises a neutral electron donor ligand. Non-limiting examples of suitable ligands include those containing an atom, such as oxygen, nitrogen, phosphorous or sulfur, which has a non-bonded electron pair. Examples of such ligands include, but are not limited to, ethers, amines, phosphines, and thioethers. In one embodiment, the neutral donor is an amine such as ammonia, monoalkylamine, dialkylamine, or trialkylamine. In one embodiment, the electron donor ligand is a tricycloalkyl-, triaryl-, or trialkylphosphine. In one embodiment, the electron donor ligand is a solvent molecule such as tetrahydrofuran (THF), $H_2O$, MeOH, or EtOH. In one embodiment, the electron donor ligand is a ligand containing one or more 2-bonds, such as alkenyl, alkynyl, aryl, and the like. In one embodiment, the electron donor ligand is a heterocyclic or heteroaryl compound containing a non-bonded electron pair, as would be understood by one of skill in the art. In one embodiment, the electron donor ligand is a bidentate electron donor ligand such as ethylene diamine, phenanthroline, 2,2'-bipyridine, and the like. In one embodiment, the neutral electron donor ligand is a ligand that exhibits backbonding, such as CO.

In one embodiment, the cationic transition metal complex comprises an anionic ligand. Exemplary anionic ligands include, but are not limited to, hydride, substituted or unsubstituted alkyl, halo, hydroxy, alkoxy, aryloxy, silyl, amide, phosphide, cyano, nitrite, or combinations thereof. In one embodiment, the anionic ligand is an alkyl ligand such as methyl, ethyl, propyl, butyl, amyl, isoamyl, hexyl, iso-butyl, heptyl, octyl, nonyl, decyl, cetyl, 2-ethylhexyl, phenyl, and the like. In one embodiment, the anionic ligand is a halogen such as F, Cl, Br, or I. In one embodiment, the anionic ligand is an alkoxide such as methoxide, ethoxide, phenoxide, or substituted phenoxide. In one embodiment, the anionic ligand is an amide such as dimethylamide, diethylamide, methylethylamide, di-t-butylamide, diisopropylamide, and the like. In one embodiment, the anionic ligand is a phosphide such as diphenylphosphide, dicyclohexylphosphide, diethylphosphide, dimethylphosphide and the like. In one embodiment, the anionic ligand is cyclopentadienyl. In one embodiment, the cationic transition metal complex comprises a bidentate anionic ligand such as acetylacetonate, glycinate (or other comparable amino acid), and the like. In one embodiment, the total number of anionic ligands on the cationic transition metal complex does not exceed the oxidation state of the transition metal.

In one embodiment, the step of adsorbing a cationic transition metal complex onto the substrate surface comprises the step adding an aqueous solution comprising the cationic transition metal complex to an aqueous suspension comprising the substrate. In one embodiment, the aqueous solution comprising the cationic transition metal complex comprises between about 1.0 wt % and about 5.0 wt % transition metal. In one embodiment, In one embodiment, the aqueous solution comprising the cationic transition metal complex comprises 1.0 wt %, 1.5 wt %, 2.0 wt %, 2.5 wt %, 3.0 wt %, 3.5 wt %, 4.0 wt %, 4.5 wt %, or 5.0 wt % transition metal.

In one embodiment, the step of adsorbing a cationic transition metal complex further comprises the step of washing the substrate-supported cationic transition metal complex. In one embodiment, the step of adsorbing a cationic transition metal complex further comprises the step of drying the substrate-supported cationic transition metal complex.

In one embodiment, the anionic transition metal complex comprises a transition metal coordination complex with an overall negative charge. In one embodiment, the anionic transition metal complex comprises a transition metal atom having an oxidation state of 0 or greater and one or more anionic ligands, such that the overall formal charge of the coordination complex is negative. Exemplary transition metal atoms include, but are not limited to, Ti, V, Cr, Mn, Fe, Co, Ni, Cu, Zn, Zr, Nb, Mo, Tc, Ru, Rh, Pd, Ag, Cd, Hf, Ta, W, Re, Os, Ir, Pt, Au, and Hg.

In one embodiment, the anionic transition metal complex further comprises a weakly-held cationic counterion. Exemplary cationic counterions include inorganic cations (e.g., metal cations such as alkali metal cations, alkali earth metal cations, and transition metal cations) and organic cations (e.g., ammonium cations, sulfonium cations, phosphonium cations, and pyridinium cations). In one embodiment, the anionic transition metal complex comprises one or more water atoms. In one embodiment, the anionic transition metal complex comprises more than one type of transition metal. In one embodiment, the weakly-held cationic counterion is $Na^+$, $K^+$, Tetraoctylammonium (TOA), tetrabutylammonium (TBA+), tetraethylammonium (TEA+), or tetrapropylammonium (TPA+).

In one embodiment, the charge of the anionic transition metal complex is an integer value between −1 and −5. In one embodiment, the charge of the anionic transition metal complex is −1. In one embodiment, the charge of the anionic transition metal complex is −2. In one embodiment, the charge of the anionic transition metal complex is −3. In one embodiment, the charge of the anionic transition metal complex is −4. In one embodiment, the charge of the anionic transition metal complex is −5.

In one embodiment, the anionic transition metal complex comprises one or more neutral ligands disclosed herein. In one embodiment, the anionic transition metal complex comprises one or more anionic ligands disclosed herein. In one embodiment, the anionic transition metal complex comprises a transition metal coordination complex selected from the group consisting of $PtCl_4^{2-}$, $IrCl_6^{2-}$, and $AuCl_4^-$.

In one embodiment, the anionic transition metal complex is adsorbed onto the substrate-supported cationic transition metal complex. In one embodiment, the anionic transition metal complex is deposited on the substrate-supported cationic transition metal complex. In one embodiment, the adsorption of the anionic transition metal complex forms a salt pair of transition metal complexes. In one embodiment, the anionic transition metal complex and the substrate-supported cationic transition metal complex form a heterometallic double complex salt (DCS). In one embodiment, the ratio of transition metal in the cationic transition metal complex to transition metal in the anionic transition metal complex is between about 2:1 and about 1:2. In one embodiment, the molar ratio of cationic transition metal complex to anionic transition metal complex is about 2:1, about 3:2, about 4:3, about 1:1, about 3:4, about 2:3, or about 1:2.

In one embodiment, the step of adsorbing an anionic transition metal complex onto the substrate-supported cationic transition metal complex to form a substrate-supported multimetallic complex salt comprises the steps of adding the anionic transition metal complex to a suspension of the substrate in water. In one embodiment, the step of adsorbing an anionic transition metal complex onto the substrate-supported cationic transition metal complex to form a substrate-supported multimetallic complex salt comprises the steps of adding the anionic transition metal complex to a suspension of the substrate in an aprotic solvent. In one embodiment, the step of adsorbing an anionic transition metal complex onto the substrate-supported cationic transition metal complex comprises the steps of preparing an aqueous solution of the anionic transition metal complex; adding a phase transfer agent to the aqueous solution; and adding an aprotic solvent to the aqueous solution to form a biphasic mixture. In one embodiment, adding the aprotic solvent and the phase transfer agent causes the anionic transition metal complex to phase transfer to the aprotic solvent. In one embodiment, the step of adsorbing an anionic transition metal complex onto the substrate-supported cationic transition metal complex further comprises the step of separating the biphasic mixture, such as via centrifugation liquid-liquid extraction, and the like, discarding the aqueous phase, and adding the organic phase comprising the aprotic solvent, phase transfer agent, and anionic transition metal complex to a suspension of the substrate-supported cationic transition metal complex in an aprotic solvent. In one embodiment, the aprotic solvent comprising the substrate-supported cationic transition metal complex and the aprotic solvent comprising the phase transfer agent and anionic transition metal complex are the same or different.

In one embodiment, the aprotic solution comprising the anionic transition metal complex comprises between about 1.0 wt % and about 5.0 wt % transition metal. In one embodiment, In one embodiment, the aprotic solution comprising the anionic transition metal complex comprises 1.0 wt %, 1.5 wt %, 2.0 wt %, 2.5 wt %, 3.0 wt %, 3.5 wt %, 4.0 wt %, 4.5 wt %, or 5.0 wt % transition metal.

As is understood by those of skill in the art, the aprotic solvent is incapable of providing hydrogen atoms for neutralization (i.e., H+) or hydrogen bonding. In one embodiment, the aprotic solvent is a coordinating solvent such as acetonitrile, dimethylformamide, dimethylsulfoxide, acetone, propylene carbonate, N-methyl-2-pyrrolidone, hexamethylphosphoramide, γ-valerolactone, dimethyl acetamide, ethyl acetate, pyridine, sulfolane, and ethers such as tetrahydrofuran, diethyl ether, diglyme, dioxane, methyl tert-butyl ether. In one embodiment, the aprotic solvent is a weakly-coordinating or non-coordinating solvent. Exemplary weakly- or non-coordinating solvents include, but are not limited to, chlorinated solvents such as dichloromethane, chloroform, and carbon tetrachloride; aromatic solvents such as benzene, toluene, cumene, xylenes (ortho, meta, para, or mixtures thereof), mesitylene, and indane; and aliphatic solvents such as pentane, hexane, hexene, octane, cyclohexane, iso-octane, and 1-hexene.

The phase transfer agent can be any phase transfer agent known to those of skill in the art. In one embodiment, the phase transfer agent is polyethylene glycol dimethyl ether. In one embodiment, the phase transfer agent is a cyclic polyethylene glycol (crown ether). Exemplary crown ethers include, but are not limited to, 12-crown-4, 15-crown-5, 18-crown-6, and dibenzo-18-crown-6. In one embodiment, the phase transfer agent is a quaternary ammonium salt or a guanidinium salt. In one embodiment, the phase transfer agent comprises a quaternary ammonium or guanidinium cation and an anion. Exemplary quaternary ammonium cations include, but are not limited to, benzyldimethylhexadecylammonium, benzyltrialkylammonium, benzyltributylammonium, benzyltriethylammonium, benzyltrimethylammonium, benzyl-tri-n-butylammonium, benzyltripropylammonium, cetylpyridinium, cetyltrialkylammonium, cetyltriethylammonium, cetyltrimethylammonium, ethylhexadecyldimethylammonium, guanidinium, 1,1,3,3-tetramethylguanidinium, hexadecylpyridinium, hexadecyltrimethylammonium, methyltributylammonium, methyltriethylammonium, methyltriphenylammonium, methyltripropylammonium, phenyltrimethylammonium, tetrabutylammonium, tetradecylammonium, tetradecyltrihexylammonium, tetradodecylammonium, tetraethylammonium, tetraheptylammonium, tetrahexylammonium, tetrakis-(decyl)-ammonium, tetramethylammonium, tetranonylammonium, tetraoctadecylammonium, tetraoctylammonium, tetrapentylammonium, tetrapropylammonium, tributylbenzylammonium, tributylmethylammonium, triethylmethylammonium, trimethylphenylammonium, and trimethylvinylammonium cations. Exemplary anions include, but are not limited to, fluoride, chloride, bromide, iodide, acetate, hydrogen sulfate, formate, and hexafluorophosphate. In one embodiment, the quaternary ammonium salt is selected from the group consisting of tetraoctylammonium bromide, tetrabutylammonium bromide, and tetrapropylammonium bromide.

In one embodiment, the phase transfer agent is a phosphonium salt. In one embodiment, the phosphonium salt comprises a phosphonium cation and an anion. In one embodiment, the anion is selected from the group consisting of fluoride, chloride, bromide, iodide, acetate, hydrogen sulfate, formate, and hexafluorophosphate. In one embodiment, the phosphonium cation is selected from the group consisting of ethyltriphenylphosphonium, trihexyltetradecylphosphonium, tetrabutylphosphonium, benzyltriphenylphosphonium, carboxybutyltriphenylphosphonium, hexadecyltributylphosphonium, tetrapentylphosphonium, tetraphenylphosphonium, and tetrapropylphosphonium cations.

In one embodiment, the molar ratio of phase transfer agent to anionic transition metal complex is approximately equal to the negative charge of the anionic metal complex. In one embodiment, the ratio of phase transfer agent to anionic transition metal complex is slightly greater than the negative charge of the anionic metal complex. In one embodiment, the ratio of phase transfer agent to anionic metal complex is between 1.0 and 2.0 times the negative charge of the anionic metal complex. In one embodiment, the ratio of phase transfer agent to anionic metal complex is between 1.0 and 1.5 times the negative charge of the anionic metal complex. In one embodiment, the ratio of phase transfer agent to anionic metal complex is about 1.0, 1.1, 1.2, 1.3, 1.4, or 1.5 times the negative charge of the anionic metal complex.

In one embodiment, the step of adsorbing an anionic transition metal complex onto the substrate-supported cationic transition metal complex to form a substrate-supported multimetallic complex salt further comprises the step of purifying the substrate-supported multimetallic complex salt. In one embodiment, the step of purifying the substrate-supported multimetallic complex salt comprises the steps of separating the substrate-supported multimetallic complex salt from the aprotic solvent. In one embodiment, the substrate-supported multimetallic complex salt is separated via filtration or centrifugation. In one embodiment, the separated substrate-supported multimetallic complex salt is washed with aprotic solvent and dried.

In one embodiment, the step of adsorbing an anionic transition metal complex onto the substrate-supported cationic transition metal complex to form a substrate-supported multimetallic complex salt further comprises the step of adsorbing a second cationic transition metal complex onto the anionic transition metal complex. In one embodiment, the adsorption of the second cationic transition metal complex onto the anionic transition metal salt forms a heterometallic triple complex salt. In one embodiment, the second transition cationic transition metal complex comprises any transition metal complex described herein.

In one embodiment, the step of adsorbing a second cationic transition metal complex onto the anionic transition metal complex comprises the steps of adding the second cationic transition metal complex to a suspension of the substrate in an aprotic solvent. In one embodiment, the step of adsorbing a second cationic transition metal complex onto the anionic transition metal complex further comprises the steps of exchanging at least one counterion of the second cationic transition metal complex with a non-coordinative anion. In one embodiment, the non-coordinative anion increases the solubility of the second cationic transition metal complex in aprotic solvents. Exemplary non-coordinative anions include, but are not limited to, tetrafluoroborate ($[BF4]^-$), hexafluorophosphate ($[PF6]^-$), perchlorate ($[ClO4]^-$), trifluoromethanesulfonate ($[CF_3SO_3]^-$), tetrakis [3,5-bis(trifluoromethyl)phenyl]borate ($[B[3,5-(CF_3)_2C_6H_3]_4]^-$), tetrakis(pentafluorophenyl)borate ($[B(C_6F_5)_4]^-$), $[Al(OC(CF_3)_3)_4]^-$, and carborane ($[CB_{11}H_{12}]^-$). In one embodiment, the non-coordinative anion is added as a salt and the resulting counterion salt is filtered from the aprotic solvent.

In one embodiment, the ratio of transition metal in the second cationic transition metal complex to transition metal in the anionic transition metal complex is between about 2:1 and about 1:2. In one embodiment, the molar ratio of second cationic transition metal complex to anionic transition metal complex is about 2:1, about 3:2, about 4:3, about 1:1, about 3:4, about 2:3, or about 1:2.

In one embodiment, the step of reducing the substrate-supported multimetallic complex salt to provide a plurality of multimetallic nanoparticles comprises the step of treating the substrate-supported multimetallic complex salt with hydrogen gas. In one embodiment, the substrate-supported multimetallic complex salt is reduced in a hydrogen atmosphere. In one embodiment, the substrate-supported multimetallic complex salt is reduced in an atmosphere comprising hydrogen. In one embodiment, the substrate-supported multimetallic complex salt is reduced in an atmosphere comprising hydrogen and at least one inert gas, such as nitrogen, helium, or argon. In one embodiment, the substrate-supported multimetallic complex salt is reduced in an atmosphere comprising 10% hydrogen in an inert gas.

In one embodiment, the substrate-supported multimetallic complex salt is reduced by treating the substrate-supported multimetallic complex salt with a reducing agent such as hydrogen gas, hydrazine, borohydrazids, organoboranes, or the like.

In one embodiment, the substrate-supported multimetallic complex salt is reduced in a solution of aprotic solvent. In one embodiment, the substrate-supported multimetallic complex salt is reduced in a vessel capable of sustaining high temperatures, such as an oven or the like. In one embodiment, the substrate-supported multimetallic complex salt is heated during the reduction process. In one embodiment, the substrate-supported multimetallic complex salt is reduced at a temperature greater than or approximately equal to 100° C., greater than or approximately equal to 125° C., greater than or approximately equal to 150° C., greater than or approximately equal to 175° C., greater than or approximately equal to 200° C., greater than or approximately equal to 225° C., greater than or approximately equal to 250° C., greater than or approximately equal to 275° C., greater than or approximately equal to 300° C., greater than or approximately equal to 325° C., greater than or approximately equal to 350° C., greater than or approximately equal to 375° C., or greater than or approximately equal to 400° C. In one embodiment, the reduction of the substrate-supported multimetallic complex salt follows a temperature program, as would be understood by one of skill in the art. In one embodiment, the temperature program starts at a lower temperature and then increases at a proscribed rate to a final temperature. In one embodiment, the rate of temperature increase is between about 10° C./min and about 100° C./min. In one embodiment, the rate of temperature increase is between about 10° C./min and about 50° C./min. In one embodiment, the rate of temperature increase is between about 10° C./min and about 25° C./min. In one embodiment, the rate of temperature increase is about 20° C./min.

Compositions of the Invention

In one aspect, the present invention relates to multimetallic nanoparticles prepared using the method disclosed herein.

In one aspect, the present invention relates to a composition of multimetallic nanoparticles comprising at least two metals $M_a$ and $M_b$; wherein the ratio of $M_a$ to $M_b$ is between about 2:1 and about 1:2.

In one embodiment, metals $M_a$ and $M_b$ are each independently selected from the group consisting of alkali metals, alkaline metals, transition metals, and metalloids. In one embodiment, $M_a$ and $M_b$ are each transition metals. Exemplary transition metal atoms include, but are not limited to, Ti, V, Cr, Mn, Fe, Co, Ni, Cu, Zn, Zr, Nb, Mo, Tc, Ru, Rh, Pd, Ag, Cd, Hf, Ta, W, Re, Os, Ir, Pt, Au, and Hg. In one embodiment, $M_a$ and $M_b$ represent different transition metals. In one embodiment, $M_a$ is selected from the group consisting of Pt, Pd, Fe, Co, Ni, and Cu. In one embodiment, $M_b$ is selected from the group consisting of Ir, Pt, and Au.

In one embodiment, metals $M_a$ and $M_b$ are each neutral. In one embodiment, metals $M_a$ and $M_b$ have a valency of 0. In one embodiment, metals $M_a$ and $M_b$ have an oxidation state of 0. In one embodiment, the multimetallic nanoparticles do not comprise ligands.

In one embodiment, the ratio of $M_a$ to $M_b$ can be controlled using the methods described herein. In one embodiment, the ratio of $M_a$ to $M_b$ describes the average ratio of the nanoparticles. In one embodiment, the ratio of $M_a$ to $M_b$ is between about 2:1 and 1:2. In one embodiment, the ratio of $M_a$ to $M_b$ is about 2:1. In one embodiment, the ratio of $M_a$ to $M_b$ is about 3:2. In one embodiment, the ratio of $M_a$ to $M_b$ is about 4:3. In one embodiment, the ratio of $M_a$ to $M_b$ is about 1:1. In one embodiment, the ratio of $M_a$ to $M_b$ is about 3:4. In one embodiment, the ratio of $M_a$ to $M_b$ is about 2:3. In one embodiment, the ratio of $M_a$ to $M_b$ is about 1:2.

In one embodiment, the nanoparticle size can be controlled using the methods described herein. In one embodiment, the nanoparticles are between about 0.5 nm and 100 nm. In one embodiment, the nanoparticles are between 0.5 and 20 nm in size. In one embodiment, the nanoparticles are between 1 nm and 3 nm in size. In one embodiment, the nanoparticles are between about 1 nm and 2 nm in size. In one embodiment, the nanoparticles are about 1.0 nm, 1.1 nm, 1.2 nm, 1.3 nm, 1.4 nm, 1.5 nm, 1.6 nm, 1.7 nm, 1.8 nm, 1.9 nm, 2.0 nm, 2.1 nm, 2.2 nm, 2.3 nm, 2.4 nm, 2.5 nm, 2.6 nm, 2.7 nm, 2.8 nm, 2.9 nm, or 3.0 nm in size.

In one embodiment, the multimetallic nanoparticles further comprise metal $M_c$. In one embodiment, $M_c$ is selected from the group consisting of alkali metals, alkaline metals, transition metals, and metalloids. In one embodiment, $M_c$ is a metalloid. In one embodiment, $M_c$ is a transition metal. In one embodiment, $M_c$ is selected from the group consisting of Ti, V, Cr, Mn, Fe, Co, Ni, Cu, Zn, Zr, Nb, Mo, Tc, Ru, Rh, Pd, Ag, Cd, Hf, Ta, W, Re, Os, Ir, Pt, Au, and Hg. In one embodiment, $M_c$ represents a metal different from $M_a$ and $M_b$. In one embodiment, $M_c$ represents the same metal as $M_a$. In one embodiment, $M_c$ represents the same metal as $M_b$. In one embodiment, $M_c$ is selected from the group consisting of Pt, Pd, Fe, Co, Ni, and Cu.

In one embodiment, the ratio of $M_c$ to $M_b$ can be controlled using the methods described herein. In one embodiment, the ratio of $M_c$ to $M_b$ describes the average ratio of the nanoparticles. In one embodiment, the ratio of $M_c$ to $M_b$ is between about 2:1 and 1:1, or between about 1:1 and 1:2. In one embodiment, the ratio of $M_c$ to $M_b$ is about 2:1. In one embodiment, the ratio of $M_c$ to $M_b$ is about 3:2. In one embodiment, the ratio of $M_c$ to $M_b$ is about 4:3. In one embodiment, the ratio of $M_c$ to $M_b$ is about 1:1. In one embodiment, the ratio of $M_c$ to $M_b$ is about 3:4. In one embodiment, the ratio of $M_c$ to $M_b$ is about 2:3. In one embodiment, the ratio of $M_c$ to $M_b$ is about 1:2.

In one embodiment, metals $M_a$, $M_b$, and optional metal $M_c$ are evenly distributed throughout individual multimetallic nanoparticles. In one embodiment, the multimetallic nanoparticles are homogeneous. In one embodiment, metals $M_a$, $M_b$, and optional metal $M_c$ are unevenly distributed throughout individual nanoparticles. In one embodiment, the multimetallic nanoparticles exhibit nanoscopic phase segregation. In one embodiment, the multimetallic nanoparticles exhibit intraparticle phase segregation, such as at the sub-nanometer level.

In one embodiment, the multimetallic nanoparticles are supported by a solid support. In one embodiment, the multimetallic nanoparticles are embedded on the solid support. In one embodiment, the multimetallic nanoparticles are bound to the solid support. In one embodiment, the nanoparticles are bound to the solid support via covalent or coordinative bonds. In one embodiment, the nanoparticles are bound to the solid support via non-covalent or non-coordinative interactions.

In one embodiment, the solid support is any substrate disclosed herein. In one embodiment, the solid support is mesoporous. In one embodiment, the solid support comprises macropores, mesopores, and/or micropores. In one embodiment, the solid support comprises one or more oxides of silicon, aluminum, niobium, tantalum, titanium, zirconium, cerium, or tin. In one embodiment, the solid support comprises silica. In one embodiment, the solid support comprises a zeolite. In one embodiment, the solid support comprises carbon. In one embodiment, the solid support comprises activated carbon.

In one embodiment, the multimetallic nanoparticles exhibit weaker CO binding compared to monometallic nanoparticles.

Methods of Use

The present invention relates in part to reactions utilizing the inventive multimetallic nanoparticles. In one embodiment, the method comprises the step of contacting an organic compound with the multimetallic nanoparticles of the present invention. In one embodiment, the multimetallic nanoparticles are catalysts. In one embodiment, the multimetallic nanoparticles are reagents. In one embodiment, the multimetallic nanoparticles are supported by a solid support. In one embodiment, the multimetallic nanoparticles are unsupported.

Reactions utilizing the present invention include, but are not limited to, hydrogenation reactions, oxidation reactions, oil refining reactions, and reforming reactions.

In one embodiment, the multimetallic nanoparticles are used in acetylene reduction. In one embodiment, the multimetallic nanoparticles exhibit improved catalytic activity and lower ethane selectivity compared to monometallic nanoparticles.

EXPERIMENTAL EXAMPLES

The invention is further described in detail by reference to the following experimental examples. These examples are provided for purposes of illustration only, and are not intended to be limiting unless otherwise specified. Thus, the invention should in no way be construed as being limited to the following examples, but rather, should be construed to encompass any and all variations which become evident as a result of the teaching provided herein.

Without further description, it is believed that one of ordinary skill in the art can, using the preceding description and the following illustrative examples, make and utilize the composite materials of the present invention and practice the claimed methods. The following working examples therefore, specifically point out the preferred embodiments of the present invention, and are not to be construed as limiting in any way the remainder of the disclosure.

Example 1: Synthesis of Bimetallic Nanoparticles

Figure 2:
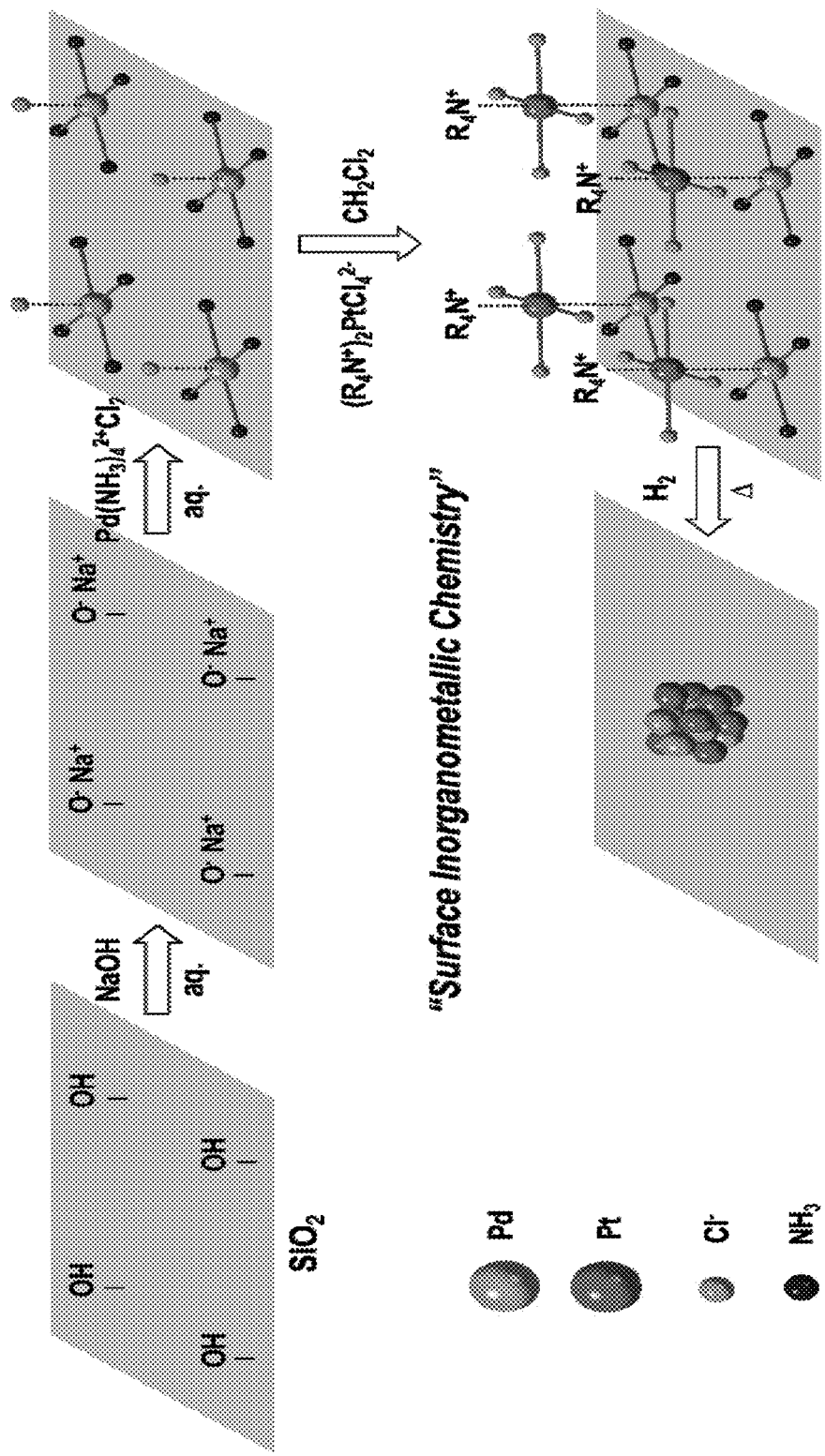
FIG. 2 is a schematic illustration of the surface inorganometallic chemistry for the synthesis of exemplary supported bimetallic NPs.

Preparation of ideally supported bimetallic NPs is viable through reduction of heterometallic double complex salt (DCS) precursors (e.g. [Pd(NH$_3$)$_4$][PtCl$_4$]), which distinct themselves from conventional candidates by their precisely defined stoichiometry and intimacy of two metals at the atomic scale. DCSs are known for two centuries and have received tremendous interest in the study of inorganometallic coordination compounds (Bremi et al., Chem. Mater., 1999, 11, 977-994; Doerrer, Dalton Trans., 2010, 39, 3543-3553). Unfortunately, the poor solubility of DCSs in many solvents greatly hinders their applications in many fields (Bremi et al., Chem. Mater., 1999, 11, 977-994; Potemkin et al., Chem. Eng. J., 2012, 207, 683-689; Potemkin et al., Catal. Today, 2014, 235, 103-111; Thompson and Lamb, J. Catal., 2017, 350, 111-121). Heterometallic DCSs can be synthesized directly on a substrate by sequential electrostatic adsorption of complex metal cations and anions, beneficial from the insoluble nature of DCSs (FIG. 2). The supported DCSs with precisely paired metal cations and anions through strong electrostatic interactions can be converted to well-defined supported bimetallic NPs upon reduction. This approach eliminates the issue of competitive adsorption of different metal cations in the coadsorption and coreduction method (Wong, et al., Science, 2017, 358, 1427-1430). It can be applied to a large variety of bimetallic NPs, including several bulk immiscible systems. The bimetallic NPs are extremely small and have narrow size distributions, and their bimetallic nature is confirmed by single-NP elemental analysis. These bimetallic catalysts outperform their parent metals in selective hydrogenation of acetylene.

Materials and Methods

Synthesis of Mesoporous Silica Support

The mesoporous SiO$_2$ support was synthesized via sol-gel process adapted from the literature (Nakanishi, J. Porous Mater., 1997, 4, 67-112; Ding et al., ACS Catal., 2016, 6, 5740-5746). 12.5 g of poly(ethylene oxide) (Mw=10$^5$, Sigma Aldrich) was dissolved in 125 g of 1 M HNO$_3$ in a VWR KIMAX Media/Storage Bottle (500-ml size) at room temperature. 81.25 g of tetraethyl orthosilicate (98%, Sigma Aldrich) was added to the solution, sealed, and stirred on a stir plate at room temperature for 30 min. The bottle was then transferred to an oven preheated to 40° C. and stood for 2.5 days. The resulted monolithic white gel was broken into small pieces (<5 mm) and immersed in 300 ml of DI H$_2$O in order to soak out the acid remained in the gel. The solvent was changed every 2 hours. The 4th solvent was 0.045 M NH$_4$OH/H$_2$O. The bottle was sealed and kept in a 40° C. oven for 24 h. The gel particles were then rinsed with DI H$_2$O and dried at 40° C. for 24 h, and then at 100° C. for 12 h. The dried gel particles were calcined in air with a temperature ramping rate of 1.5° C./min up to 600° C., kept at 600° C. for 12 h. The specific surface area of the obtained SiO$_2$ is ca. 1000 m$^2$/g, with a total pore volume of 5 ml/g (including macropores, mesopores, and micropores) (Ding et al., *ACS Catal.*, 2016, 6, 5740-5746).

Synthesis of Supported Bimetallic NPs by Sequential Electrostatic Adsorption

All operations were performed at room temperature unless otherwise noted.

Step 1. Adsorption of metal cations. In a typical synthesis, 500 mg of grinded mesoporous SiO$_2$ was dispersed in 30 ml of 10$^{-2}$ M NaOH aqueous solution. 30 min later, the SiO$_2$ was centrifuged and redispersed in 30 ml of DI H$_2$O and this washing procedure was repeated twice and then redispersed in 20 ml of DI H$_2$O for the adsorption of metal cations. The pH of the 4$^{th}$ supernatant is ~9, ensuring a negatively charged SiO$_2$ surface. 12.4 mg of Pd(NH$_3$)$_4$Cl$_2$·H$_2$O was dissolved in 10 ml of DI H$_2$O and added to the SiO$_2$ and stir for 1 h before centrifugation. The 1$^{st}$ supernatant was tested by NaBH$_4$ and showed no color change, indicating complete adsorption of metal cations. The SiO$_2$ was washed twice with DI H$_2$O and then dried at 60° C. for 24 h. Pt(NH$_3$)$_4$, Ru(NH$_3$)$_6$, Fe$^{3+}$, Co$^{2+}$, Ni$^{2+}$, and Cu$^{2+}$ cations were adsorbed on the SiO$_2$ surface in a similar procedure using corresponding chloride salts. The metal loadings are 1 wt. % for all cations except Pt, which has a metal loading of 2 wt. %.

Step 2. Adsorption of complex metal anions. The dried SiO$_2$-supported cations were used for the adsorption of complex metal anions: PtCl$_4^{2-}$, IrCl$_6^{2-}$, and AuCl$_4^-$. These anions were dissolved in CH$_2$Cl$_2$ by a simple phase-transfer procedure with the assistance of quaternary ammonium cations. Tetraoctylammonium (TOA$^+$), tetrabutylammonium (TBA$^+$), and tetrapropylammonium (TPA$^+$) cations were used for PtCl$_4^{2-}$, IrCl$_6^{2-}$, and AuCl$_4^-$, respectively. In a typical synthesis, 18.6 mg (0.0333 mmol) of Na$_2$IrCl$_6$·6H$_2$O and 23.6 mg (0.0733 mmol) of TBA$^+$Br$^-$ were dissolved in 5 ml of DI H$_2$O separately. Upon mixing, the solution became turbid, indicating the complexation of metal anions and quaternary ammonium cations. 20 ml of CH$_2$Cl$_2$ was added to the mixture and agitated by a vortex mixer for 5 min. The mixture was then centrifuged in order to form a clear phase boundary between CH$_2$Cl$_2$ and water. The water phase became colorless and was discarded. Please note that the quaternary ammonium cations are slightly in excess (TBA$^+$/IrCl$_6^{2-}$ ratio of 2.2 rather than 2) to ensure a complete phase transfer of metal anions. The SiO$_2$-supported cations were add to the CH$_2$Cl$_2$ solution of metal anions with cation/anion ratio of 1 to form SiO$_2$-supported double complex salts (DCSs). The products were centrifuged, washed with CH$_2$Cl$_2$ for three times, and dried at room temperature for 12 h.

Step 3. Reduction. The SiO$_2$-supported DCSs were reduced in a 10% H$_2$/N$_2$ flow with a temperature ramping rate of 20° C./min up to 400° C., kept at 400° C. for 30 min.

For comparison, the adsorption of metal anions was also performed by dispersing the supported cations in an aqueous solution of complex metal anions (e.g. Na$_2$IrCl$_6$). After centrifugation, washing, drying, and reduction, the products were analyzed by TEM/EDS.

Synthesis of Supported DCSs by Sequential Impregnation

For UV-Vis studies, supported DCSs with relatively higher loading (twice of that synthesized by sequential adsorption) were synthesized by sequential impregnation. In a typical synthesis, 14.1 mg of Pt(NH$_3$)$_4$Cl$_2$·H$_2$O was dissolved in 1 ml of DI H$_2$O and added to 200 mg of dried SiO$_2$ support. After drying at 60° C. for 24 h, 1 ml of aqueous solution containing 16.6 mg of K$_2$PtCl$_4$ was added to the powder and dried again at 60° C. for 24 h.

Acetylene Hydrogenation

The acetylene hydrogenation reaction was conducted in an atmospheric pressure fixed bed flow reactor system with ¼ inch quartz reactor. Acetylene (5% in N$_2$, UHP), hydrogen (5% in N$_2$, UHP), pure hydrogen (UHP), and research purity N$_2$ were provided by Airgas. The gas flow rates were controlled by mass flow controllers (MKS Instruments). The products were analyzed by an on-line Agilent 490 microGC equipped with MS-5A ($H_2$, $O_2$, $N_2$, $CH_4$, CO), Plot U ($CO_2$, $C_2H_2$, $C_2H_4$, and $C_2H_6$), and Alumina ($C_{3+}$ alkanes and $C_{3+}$ olefins) columns. Each column is connected to a separate thermal conductivity detector. $N_2$ was used as internal standard for GC quantification.

In a typical reaction test, 20 mg of supported bimetallic catalyst was mixed with 400 mg of quartz sand; reduced in 10% $H_2/N_2$ (100 sccm) at 400° C. for 30 min; cooled down to 50° C. in 10% $H_2/N_2$ (100 sccm); purged with $N_2$ (100 sccm) at 50° C. for 10 min; switched to $C_2H_2$:$H_2$:$N_2$=1 sccm:2 sccm:57 sccm; reaction temperature was increased from 50° C. to 100° C. with a ramp rate of 1° C./min.

Characterization

For transmission electron microscopy (TEM) analyses three different microscopes were utilized. Dry powder specimens suspended on a Cu grid with a lacey carbon support were used for TEM and HAADF-STEM characterization. A JEOL JEM-2011 operating at 200 kV was used for low resolution TEM imaging and large-area energy-dispersive X-ray spectroscopy (EDS) analysis. A gold TEM grid and low-background TEM holder were used for EDS analysis of the Cu—Ir/$SiO_2$ sample. A Hitachi HF3300 operating at 300 kV was used for low resolution HAADF-STEM imaging and single-NP and large-area EDS analysis. For the nanoscopically phase-segregated samples (Cu—Ir/$SiO_2$ and Pd—Ir/$SiO_2$), aberration-corrected HAADF-STEM imaging was performed on a FEI Titan S operating at 300 kV.

X-ray photoelectron spectroscopy (XPS) was conducted on Kratos AXIS 165 XPS/AES. The binding energies were adjusted to the Si 2p peaks at 103.4 eV.

UV-Vis diffuse reflectance spectra were recorded at room temperature on a Cary 5000 UV-Vis-NIR spectrophotometer equipped with a diffuse-reflectance attachment, using $BaSO_4$ as a reference.

X-ray absorption near edge structure Spectroscopy (XANES) and extended X-ray absorption fine structure (EXAFS)) measurements of the catalysts were performed at Louisiana State University's synchrotron research facility, the J. Bennett Johnston, Sr., Center for Advanced Microstructures and Devices (CAMD), USA. CAMD operates an electron storage ring at 1.3 GeV with the typical ring current between 100 and 50 mA. The Ir $L_{III}$-edge spectra were obtained at the Hexas beamline located on the multi-pole wiggler operated at 5.9 Tesla. The spectra were measured with a University of Bonn-designed Lemonnier-type double crystal monochromator with a pair of Ge 220 crystals. The monochromator was calibrated to 11215 eV with a sample of iridium powder. A reference sample was always maintained between the second and third chambers. The spectra of the catalysts were measured in fluorescence with a seven-element Ketek™ silicon drift detector array. The steps were from −200 eV to −30 eV, −30 eV to 30 eV, 30 to 100 eV, and 100 eV to 16 k, with 5 eV, 0.6 eV, 1 eV, and 0.05 k step size, respectively. All data reduction, along with linear combination fitting, was performed with Athena (Ravel and Newville, J. Synchrotron Rad., 2005, 12, 537-541). For linear combination fitting, the absorption edge locations of all spectra were corrected with the nickel foil in the reference chamber. The sum was forced to add to one.

Diffuse reflectance infrared Fourier transform spectroscopy (DRIFTS) measurements were performed on a Thermo Nicolet 6700 instrument with a Hg—Cd—Te (MCT) detector, and a Praying Mantis™ high temperature reaction chamber with KBr windows. The catalysts were pretreated with 100 sccm of 10% $H_2$/Ar at 400° C. for 30 min. The CO adsorption was performed at room temperature. 5% CO/Ar (UHP) was introduced into the DRIFTS cell at a flow rate of 100 sccm. After the CO saturation, an argon purge at a flow rate of 100 sccm was performed to remove gas phase CO from the DRIFTS cell. All the spectra were recorded using 32 scans and a resolution of 4 $cm^{-1}$.

The Results of the Experiments Will Now be Described

The adsorption of metal cations, the first elementary step for the preparation of desired DCSs, was carried out on the well-studied silica surface (Wong, et al., Science, 2017, 358, 1427-1430; Jiao and Regalbuto, J. Catal., 2008, 260, 329-341). Porous silica support was first dispersed in water and pH of the solution was then adjusted to 9 to obtain a negatively charged silica surface. After the adsorption of complex metal cations, e.g. $Pd(NH_3)_4^{2+}$, silica was then separated from the mother solution and washed with copious water and dried before the adsorption of metal anions. Initial attempts toward the subsequent anion adsorption using aqueous solution were unsuccessful, as reflected by the formation of either large aggregates (FIGS. 3A and 3B) or monometallic complexes (FIGS. 3C and 3D). While not wishing to be bound by any particular theory, it is possible that the failure of this step was due to the non-negligible solubility of DCSs in water, causing dissolution, ripening, or leaching of DCSs. To address this solubility concern, an aprotic solvent dichloromethane was utilized in the process of metal anion adsorption. To assist dissolution of the complex metal anions in dichloromethane, quaternary ammonium cations were introduced (FIG. 4). Due to the opposite charge, metal anions in dichloromethane can precisely target the metal cations pre-adsorbed on silica surface to form supported heterometallic DCSs. Further reducing these silica-supported DCSs under a flow of $H_2/N_2$ (v/v=1/9) mixture at 400° C. affords the desired silica-supported bimetallic NPs.

Figure 5:
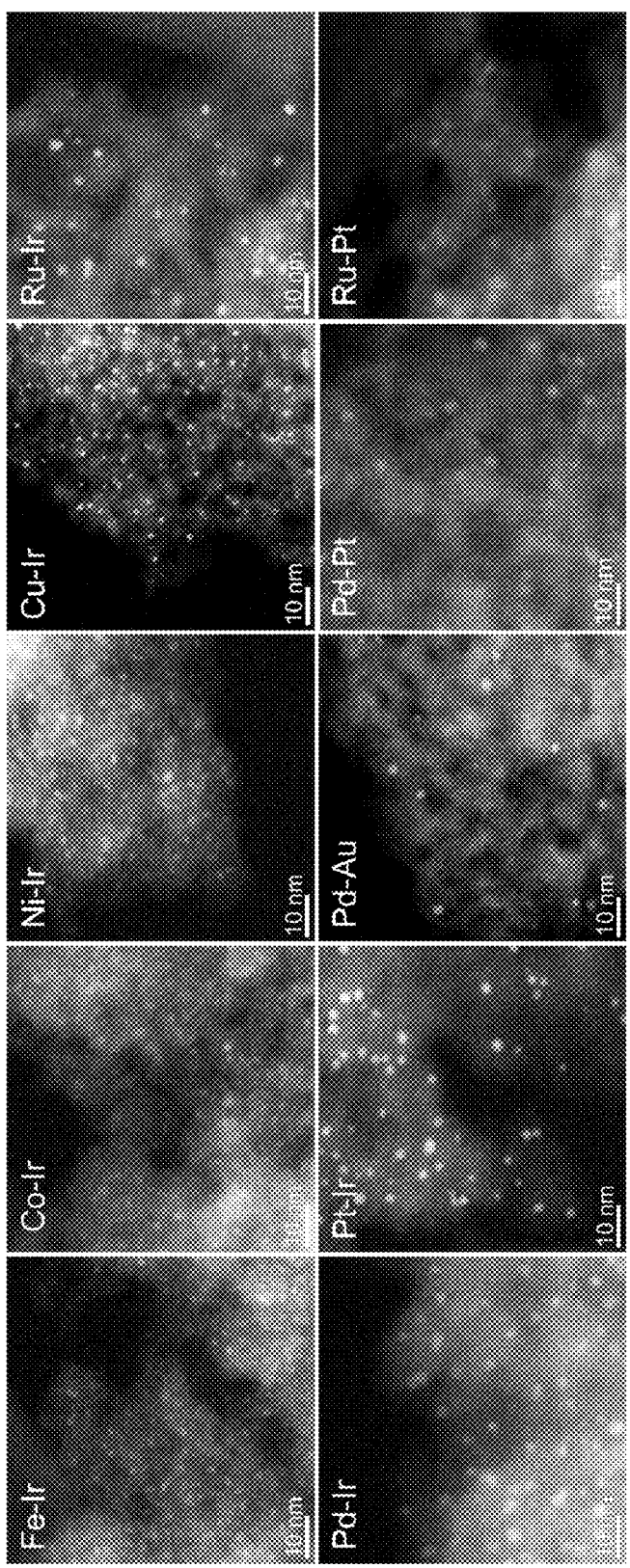
FIG. 5 depicts HAADF-STEM images of ten types of supported bimetallic NPs synthesized by an exemplary method of the present invention. All scale bars are 10 nm.
Figure 6:
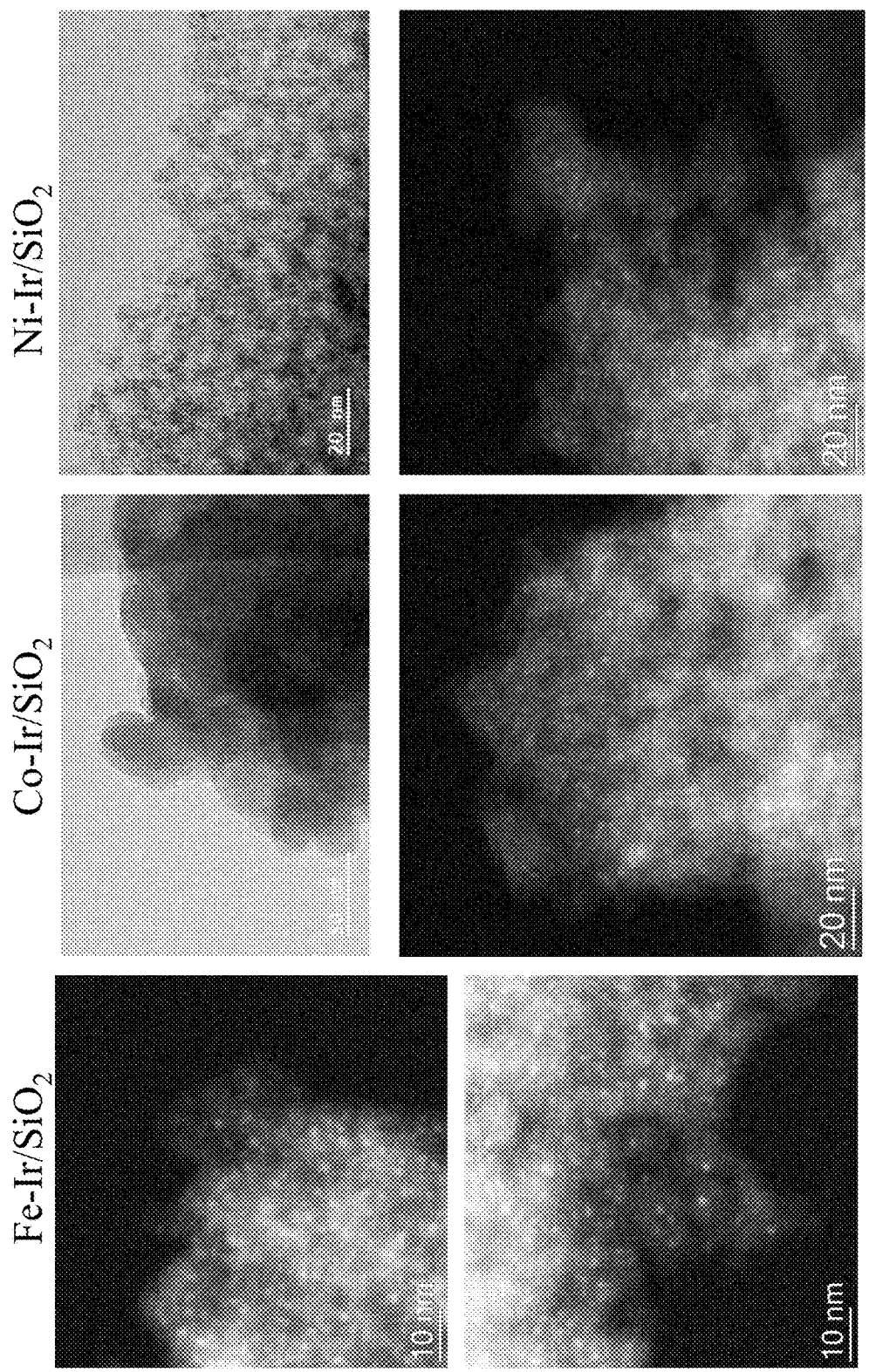
FIG. 6 depicts TEM and HAADF-STEM images of Fe—Ir/$SiO_2$, Co—Ir/$SiO_2$, and Ni—Ir/$SiO_2$ synthesized by sequential electrostatic adsorption and reduced at 400° C.
Figure 7:
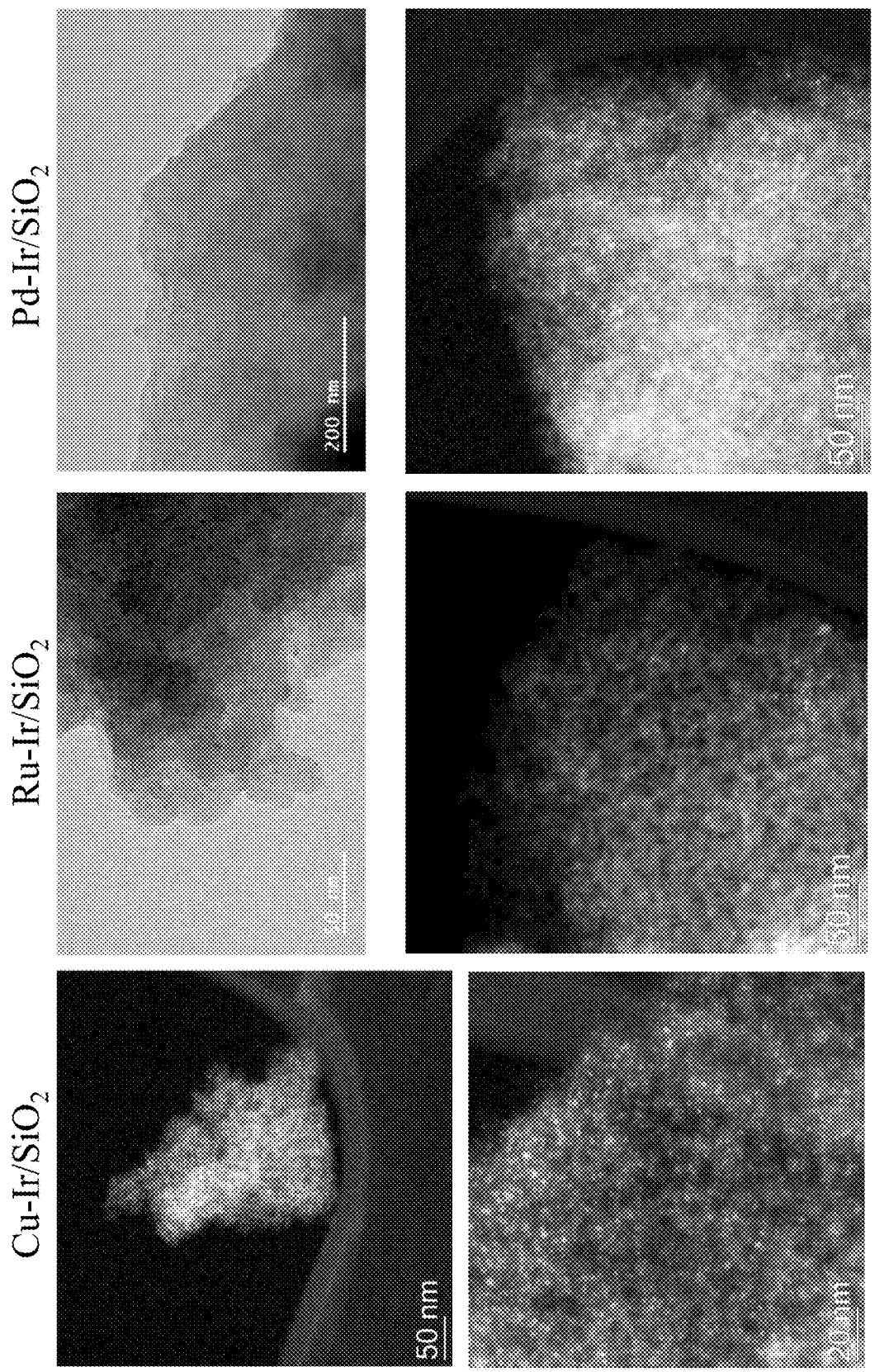
FIG. 7 depicts TEM and HAADF-STEM images of Cu—Ir/$SiO_2$, Ru—Ir/$SiO_2$, and Pd—Ir/$SiO_2$ synthesized by sequential electrostatic adsorption and reduced at 400° C.
Figure 8:
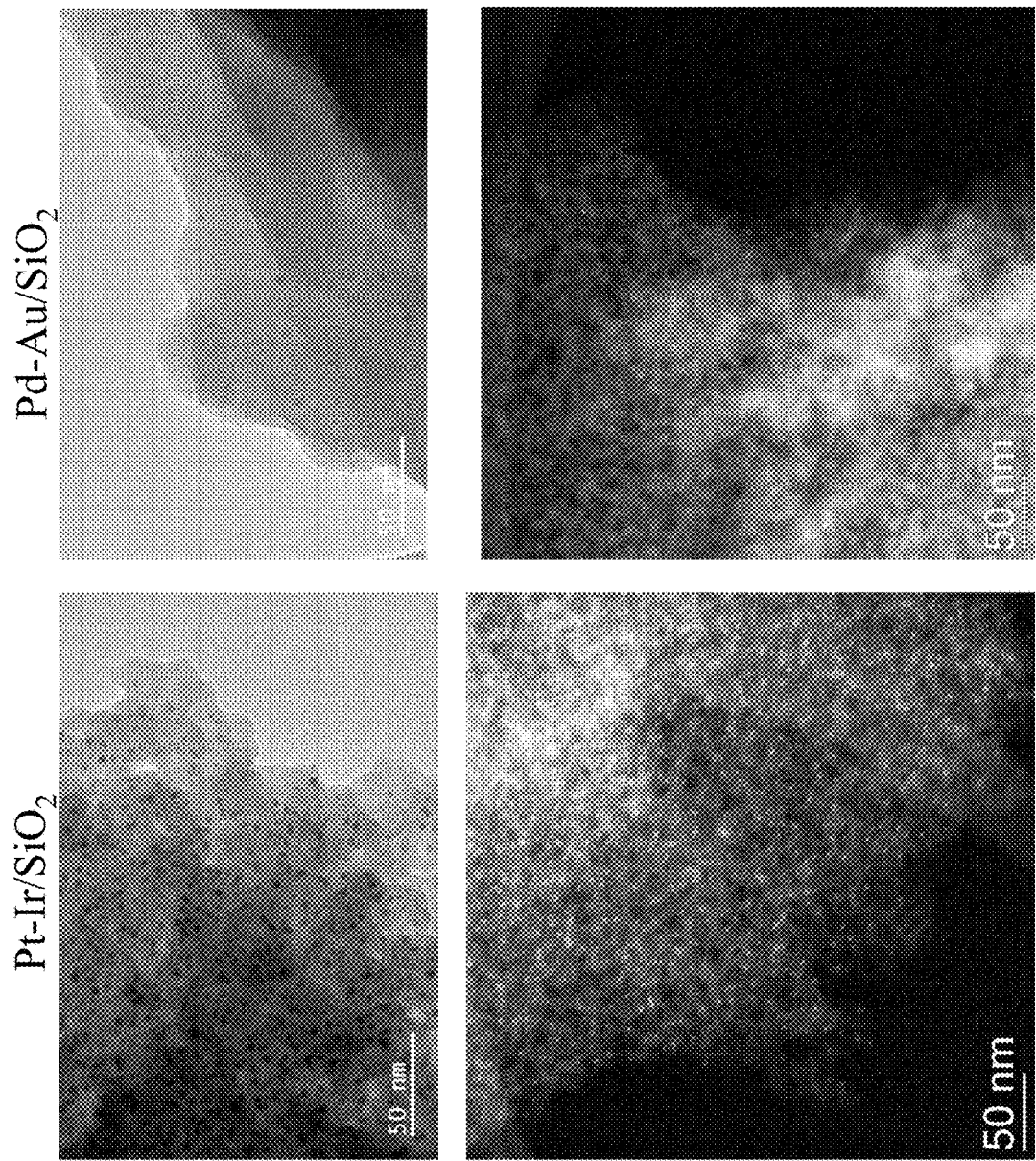
FIG. 8 depicts TEM and HAADF-STEM images of Pt—Ir/$SiO_2$ and Pd—Au/$SiO_2$ synthesized by sequential electrostatic adsorption and reduced at 400° C.

FIG. 5 shows high-angle annular dark-field scanning transmission electron microscopy (HAADF-STEM) images of ten types of supported bimetallic NPs synthesized by this approach. These NPs are mostly smaller than 3 nm in diameter and uniformly dispersed on the silica support. Large-area transmission electron microscopy (TEM) and HAADF-STEM images of these samples are shown in FIGS. 6 to 9 (Supplementary Materials). The bimetallic nature of these NPs was confirmed by single-NP energy-dispersive X-ray spectroscopy (EDS) analysis. The composition of several individual NPs was also obtained for each sample, as well as large-area EDS analysis to obtain an average composition of each sample. The quantification results are shown in Tables 1 to 10.

TABLE 1

Single-NP and large-area EDS analysis of Fe-Ir/$SiO_2$ synthesized by sequential electrostatic adsorption (reduced at 400° C.).

| Sites | Fe (atomic %) | Ir (atomic %) |
| --- | --- | --- |
| Particle 1 | 37 | 63 |
| Particle 2 | 48 | 52 |
| Particle 3 | 31 | 69 |
| Particle 4 | 57 | 43 |
| Particle 5 | 38 | 62 |
| Particles average | 42 | 58 |
| Large area | 48 | 52 |

TABLE 2

Single-NP and large-area EDS analysis of Co-Ir/SiO$_2$ synthesized by sequential electrostatic adsorption (reduced at 400° C.).

| Sites | Co (atomic %) | Ir (atomic %) |
| --- | --- | --- |
| Particle 1 | 57 | 43 |
| Particle 2 | 65 | 35 |
| Particle 3 | 56 | 44 |
| Particle 4 | 80 | 20 |
| Particle 5 | 77 | 23 |
| Particles average | 67 | 33 |
| Large area | 47 | 53 |

TABLE 3

Single-NP and large-area EDS analysis of Ni-Ir/SiO$_2$ synthesized by sequential electrostatic adsorption (reduced at 400° C.).

| Sites | Ni (atomic %) | Ir (atomic %) |
| --- | --- | --- |
| Particle 1 | 53 | 47 |
| Particle 2 | 59 | 41 |
| Particle 3 | 81 | 19 |
| Particle 4 | 51 | 49 |
| Particle 5 | 46 | 54 |
| Particles average | 58 | 42 |
| Large area | 54 | 46 |

TABLE 4

Single-NP and large-area EDS analysis of Cu-Ir/SiO$_2$ synthesized by sequential electrostatic adsorption (reduced at 400° C.).

| Sites | Cu (atomic %) | Ir (atomic %) |
| --- | --- | --- |
| Particle 1 | 44 | 56 |
| Particle 2 | 39 | 61 |
| Particle 3 | 45 | 55 |
| Particle 4 | 35 | 65 |
| Particle 5 | 35 | 65 |
| Particle 6 | 31 | 69 |
| Particles average | 38 | 62 |
| Large area | 49 | 51 |

TABLE 5

Single-NP and large-area EDS analysis of Ru-Ir/SiO$_2$ synthesized by sequential electrostatic adsorption (reduced at 400° C.).

| Sites | Ru (atomic %) | Ir (atomic %) |
| --- | --- | --- |
| Particle 1 | 32 | 68 |
| Particle 2 | 46 | 54 |
| Particle 3 | 36 | 64 |
| Particle 4 | 32 | 68 |
| Particle 5 | 28 | 72 |
| Particles average | 35 | 65 |
| Large area | 45 | 55 |

TABLE 6

Single-NP and large-area EDS analysis of Pd-Ir/SiO$_2$ synthesized by sequential electrostatic adsorption (reduced at 400° C.).

| Sites | Pd (atomic %) | Ir (atomic %) |
| --- | --- | --- |
| Particle 1 | 29 | 71 |
| Particle 2 | 44 | 56 |
| Particle 3 | 51 | 49 |
| Particle 4 | 72 | 28 |
| Particle 5 | 37 | 63 |
| Particle 6 | 48 | 52 |
| Particles average | 47 | 53 |
| Large area | 47 | 53 |

TABLE 7

Single-NP and large-area EDS analysis of Pt-Ir/SiO$_2$ synthesized by sequential electrostatic adsorption (reduced at 400° C.).

| Sites | Pt (atomic %) | Ir (atomic %) |
| --- | --- | --- |
| Particle 1 | 49 | 51 |
| Particle 2 | 62 | 38 |
| Particle 3 | 37 | 63 |
| Particle 4 | 72 | 28 |
| Particle 5 | 46 | 54 |
| Particle 6 | 62 | 38 |
| Particle 7 | 56 | 44 |
| Particles average | 55 | 45 |
| Large area | 46 | 54 |

TABLE 8

Single-NP and large-area EDS analysis of Pd-Au/SiO$_2$ synthesized by sequential electrostatic adsorption (reduced at 400° C.).

| Sites | Pd (atomic %) | Au (atomic %) |
| --- | --- | --- |
| Particle 1 | 53 | 47 |
| Particle 2 | 40 | 60 |
| Particle 3 | 76 | 24 |
| Particle 4 | 53 | 47 |
| Particle 5 | 85 | 15 |
| Particle 6 | 77 | 23 |
| Particle 7 | 34 | 66 |
| Particles average | 60 | 40 |
| Large area | 54 | 46 |

TABLE 9

Single-NP and large-area EDS analysis of Pd-Pt/SiO$_2$ synthesized by sequential electrostatic adsorption (reduced at 400° C.).

| Sites | Pd (atomic %) | Pt (atomic %) |
| --- | --- | --- |
| Particle 1 | 48 | 52 |
| Particle 2 | 68 | 32 |
| Particle 3 | 67 | 33 |
| Particle 4 | 48 | 52 |
| Particle 5 | 66 | 34 |
| Particle 6 | 54 | 46 |
| Particles average | 58 | 42 |
| Large area | 45 | 55 |

TABLE 10

Single-NP and large-area EDS analysis of
Ru-Pt/SiO$_2$ synthesized by sequential
electrostatic adsorption (reduced at 400° C.).

| Sites | Ru (atomic %) | Pt (atomic %) |
|---|---|---|
| Particle 1 | 24 | 76 |
| Particle 2 | 31 | 69 |
| Particle 3 | 60 | 40 |
| Particle 4 | 43 | 57 |
| Particles average | 40 | 60 |
| Large area | 61 | 39 |

Figure 10:
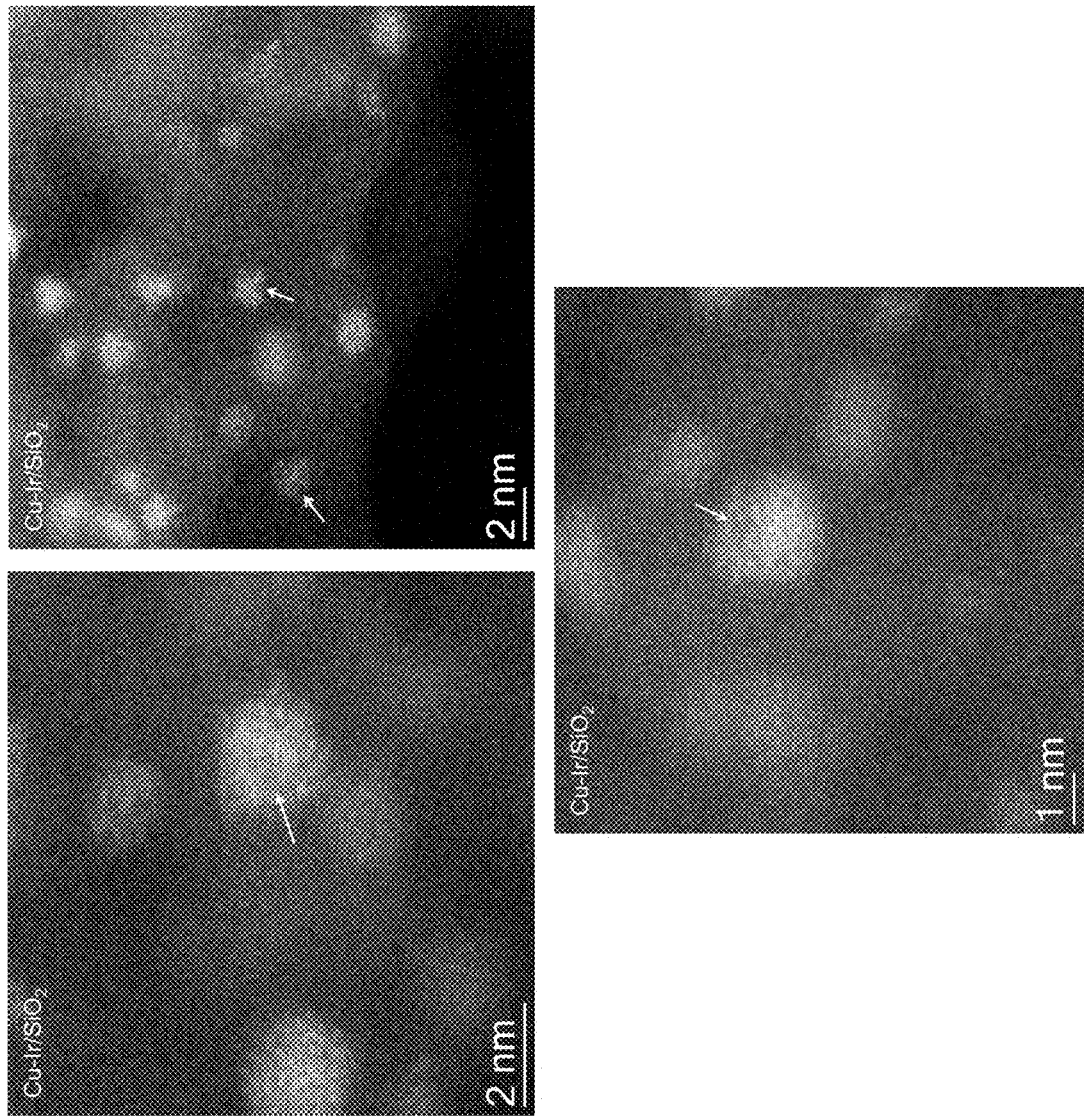
FIG. 10 depicts HAADF-STEM images of Cu—Ir/$SiO_2$ synthesized by sequential electrostatic adsorption and reduced at 400° C. Arrows mark the phase segregation.
Figure 11:
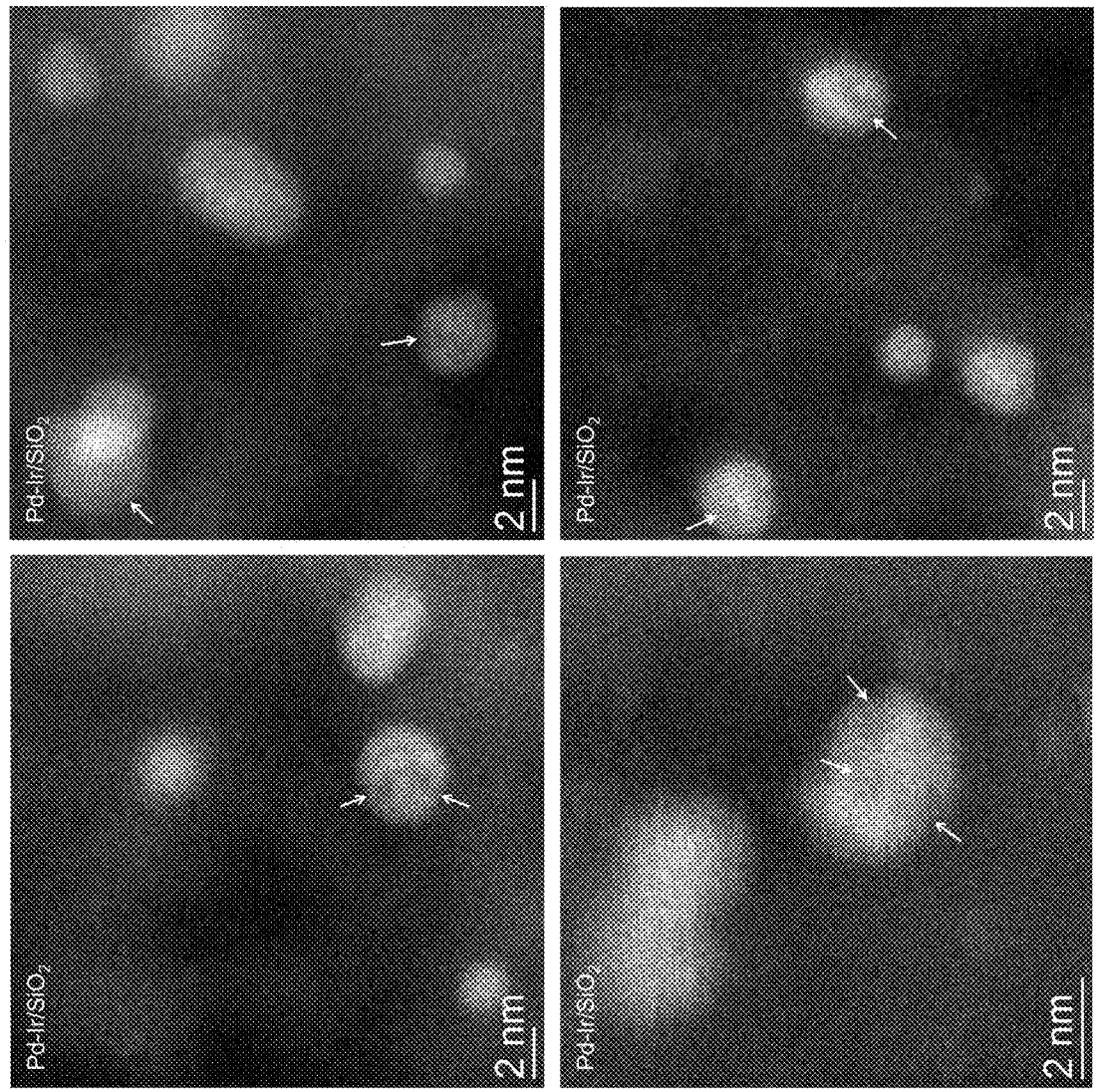
FIG. 11 depicts HAADF-STEM images of Pd—Ir/$SiO_2$ synthesized by sequential electrostatic adsorption and reduced at 400° C. Arrows mark the phase segregation.
Figure 12:
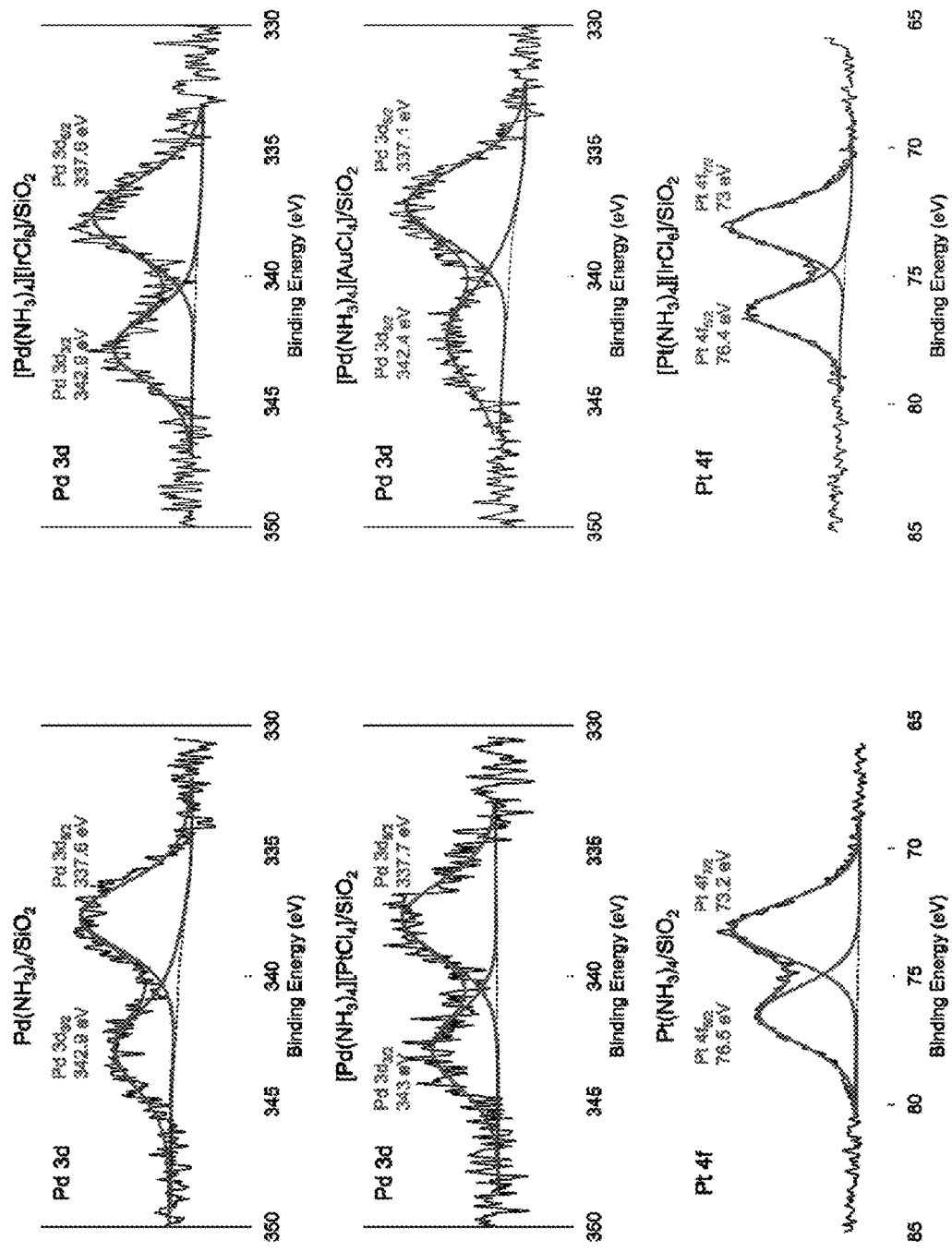
FIG. 12 depicts XPS results for the nonreduced supported complex metal cations and complex metal cations in the supported DCSs prior to reduction at 400° C.

In all cases, the single-NP analysis confirmed the NPs are bimetallic. Further, the average composition from the single-NP analysis is generally consistent with the average composition provided by large-area EDS analysis, suggesting that the supported DCSs precursors were evenly decomposed into bimetallic NPs. According to phase diagrams, Cu—Ir, Pd—Ir, and Pt—Ir systems are bulk immiscible below 800° C. (ASM HandBook Volume 3—Alloy Phase Diagrams. (ASM International, 1992)). Interestingly, these systems still form bimetallic NPs with metal ratios close to 1. Aberration-corrected HAADF-STEM images of Cu—Ir/SiO$_2$ and Pd—Ir/SiO$_2$ show uneven contrast within single NPs (FIGS. 10 and 11), suggesting the occurrence of intraparticle phase segregation at a subnanometer level. This type of nanoscopic phase segregation has been reported in several bimetallic systems, including Cu—Ir (Wang et al., Angew. Chem. Int. Ed., 2018, 57, 4505-4509), Ru—Pd (Kusada et al., J. Am. Chem. Soc., 2014, 136, 1864-1871), and Pt—Ni (Niu et al., Nat. Mater., 2016, 15, 1188-1194). The lack of macroscopic phase segregation in M-Ir systems might be partly attributed to the extremely high melting point of Ir metal, which may prevent the nanoscopically phase segregated NPs from coarsening.

Figure 15:
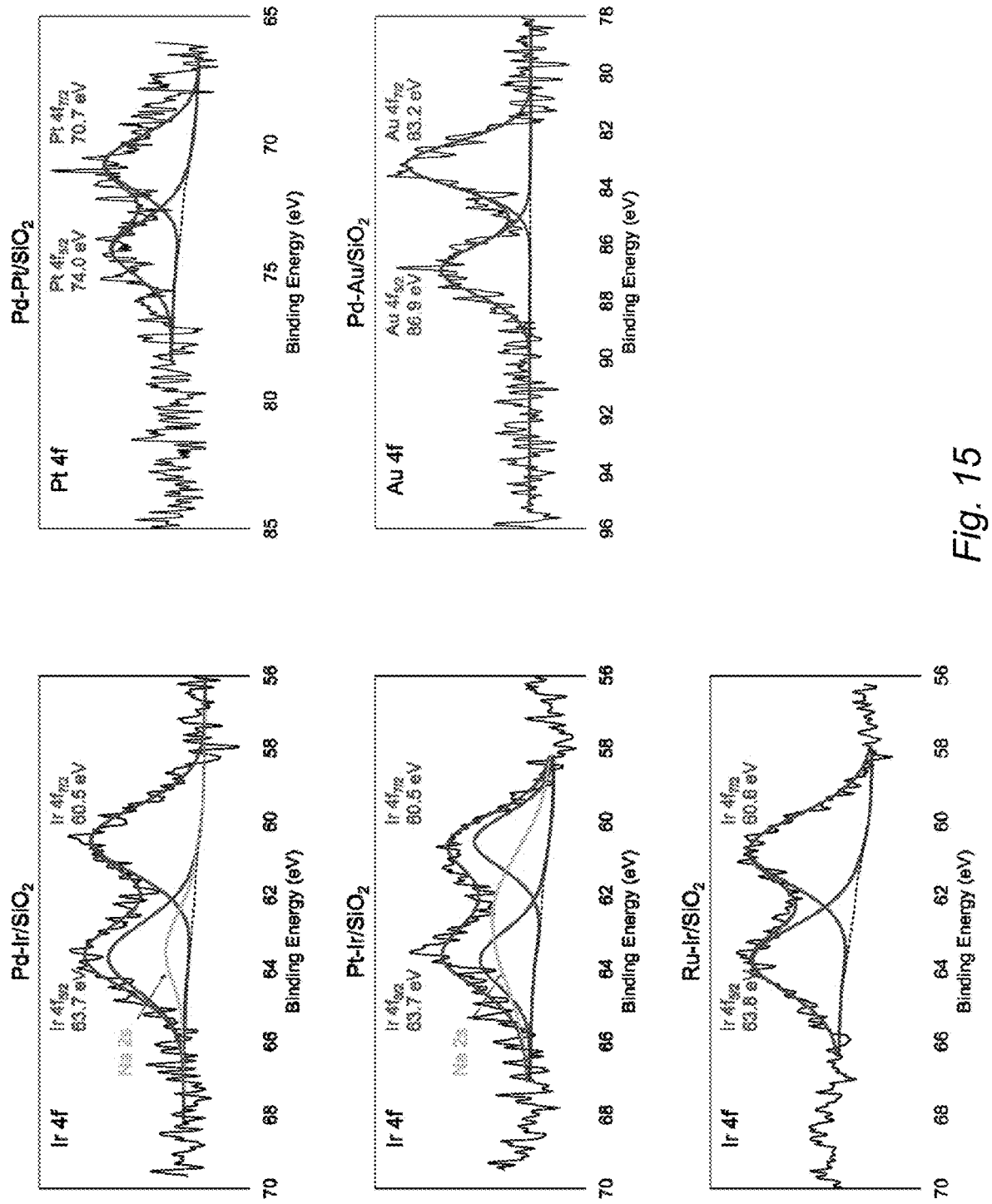
FIG. 15 depicts XPS results for the metals reduced from complex metal anions in supported DCSs after reduction at 400° C.
Figure 16:
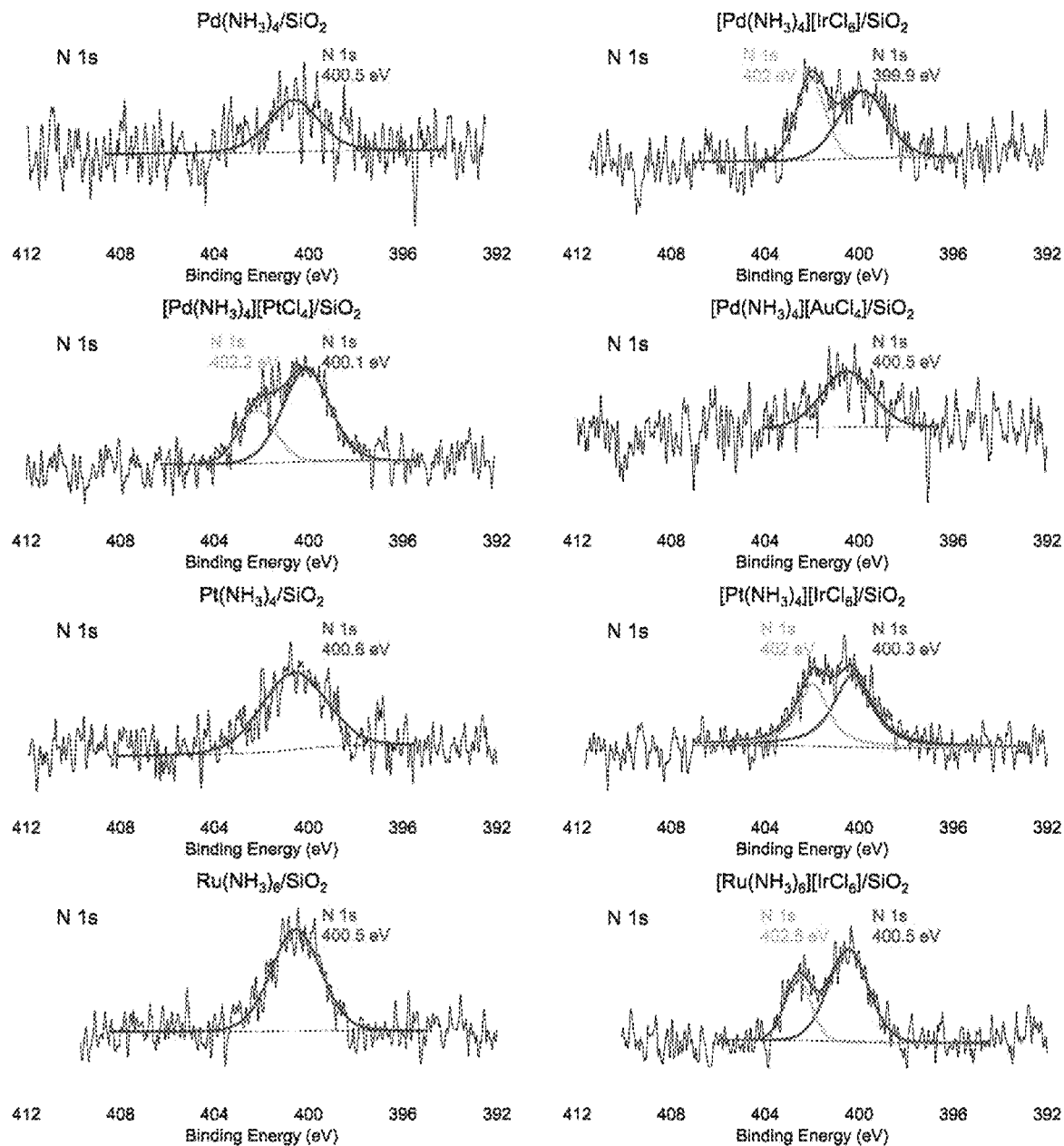
FIG. 16 depicts N is XPS results for the nonreduced supported complex metal cations and supported DCSs prior to reduction at 400° C.
Figure 19:
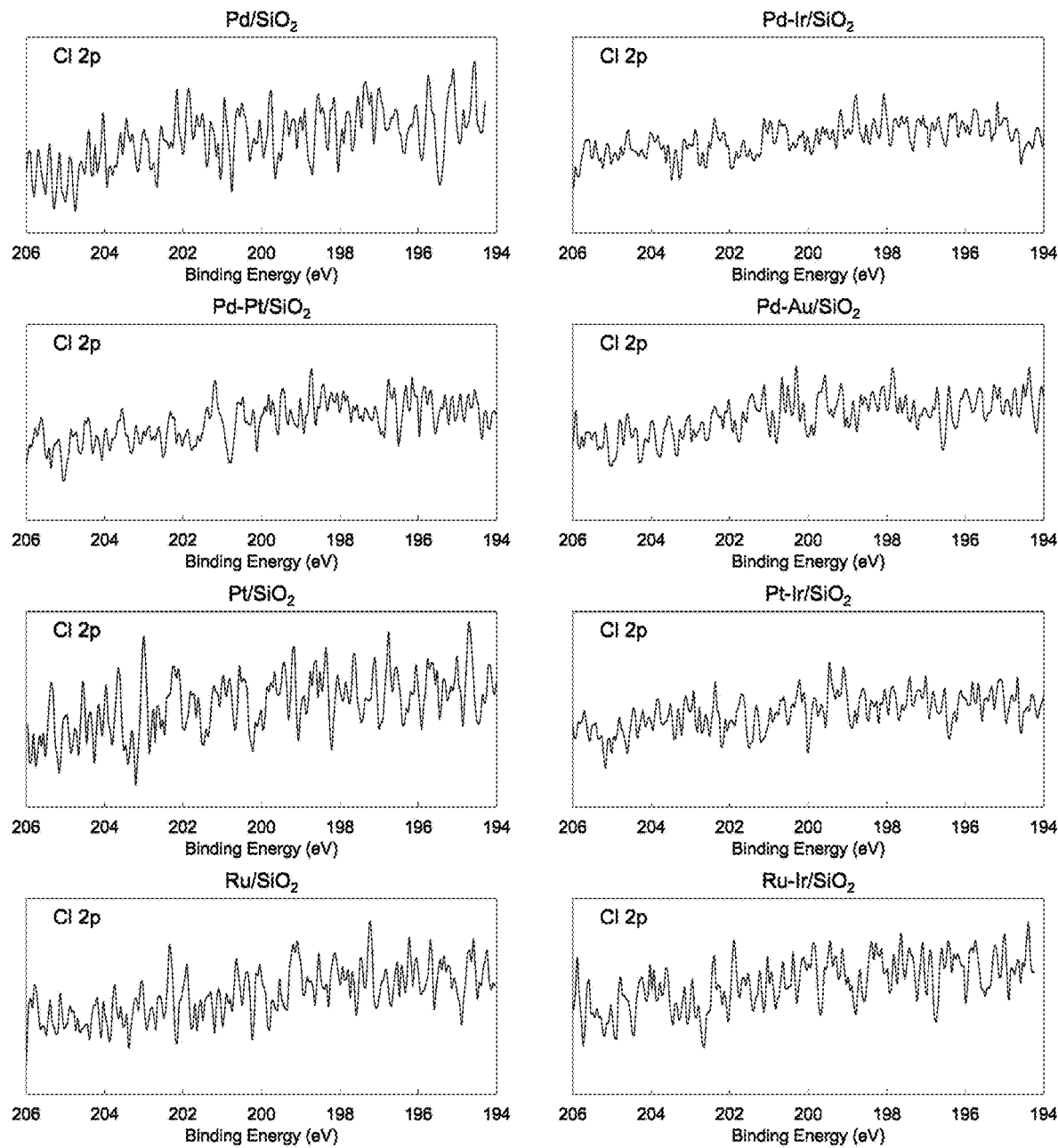
FIG. 19 depicts Cl 2p XPS results for the reduced supported complex metal cations and supported DCSs after reduction at 400° C.
Figure 20:
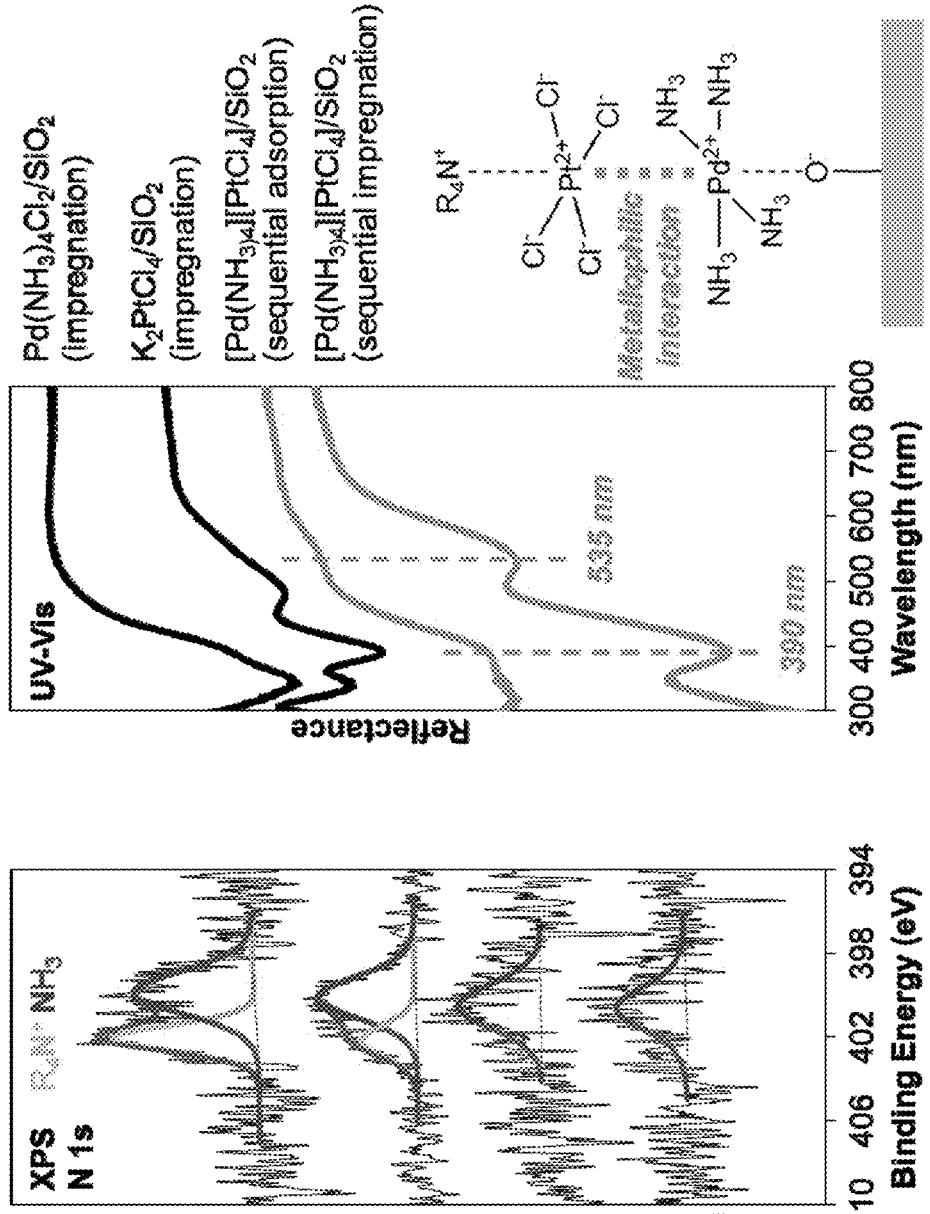
FIG. 20 depicts N is XPS and UV-Vis diffuse reflectance spectra of supported DCSs and reference compounds. The structure of [Pd(NH$_3$)$_4$][PtCl$_4$]/$SiO_2$ is illustrated on the right. The absorption bands associated with the metallophilic interaction between Pd and Pt metal centers are marked by dashed lines.

In order to validate the proposed surface inorganometallic chemistry for the bimetallic NPs synthesis, X-ray photoelectron spectroscopy (XPS) was employed to study the structural evolution of the surface intermediates during the synthesis. The XPS results are shown in FIGS. 12 to 19 and FIG. 20. After the adsorption of complex metal cations (Pd(NH$_3$)$_4$$^{2+}$, Pt(NH$_3$)$_4$$^{2+}$, and Ru(NH$_3$)$_6$$^{2+}$), the XPS signals of metals and nitrogen were observed (FIG. 2, FIGS. 12, 16, and 20). It is worth noting that weak Cl 2p signals were also observed on these samples (FIG. 18), implying that the divalent complex metal cations require an extra chloride to balance the excess positive charge. After the adsorption of complex metal anions (PtCl$_4$$^{2-}$, IrCl$_6$$^{2-}$, and AuCl$_4$$^-$), the intensity of Cl$^2$p signal increases along with the appearance of Pt, Ir, and Au signals, confirming the successful adsorption of complex metal anions. Interestingly, in addition to the N is signal from the NH$_3$ ligand (400 eV), a new N is signal was observed at 402 eV on the nonreduced [Pd(NH$_3$)$_4$][PtCl$_4$]/SiO$_2$, [Pd(NH$_3$)$_4$][IrCl$_6$]/SiO$_2$, [Pt(NH$_3$)$_4$][IrCl$_6$]/SiO$_2$, and [Ru(NH$_3$)$_4$][IrCl$_6$]/SiO$_2$ samples (FIGS. 16 and 20). The new N is signal belongs to the nitrogen atom in the quaternary ammonium cation which was used to assist the dissolution of complex metal anions. The adsorption of quaternary ammonium cations is required to balance the excess negative charge of the divalent complex anions. In contrast, no quaternary ammonium cation is needed when a monovalent anion, AuCl$_4$$^-$, is used. This was confirmed by the absence of N is signal at 402 eV for the nonreduced [Pd(NH$_3$)$_4$][AuCl$_4$]/SiO$_2$ sample (FIG. 20).

Figure 21:
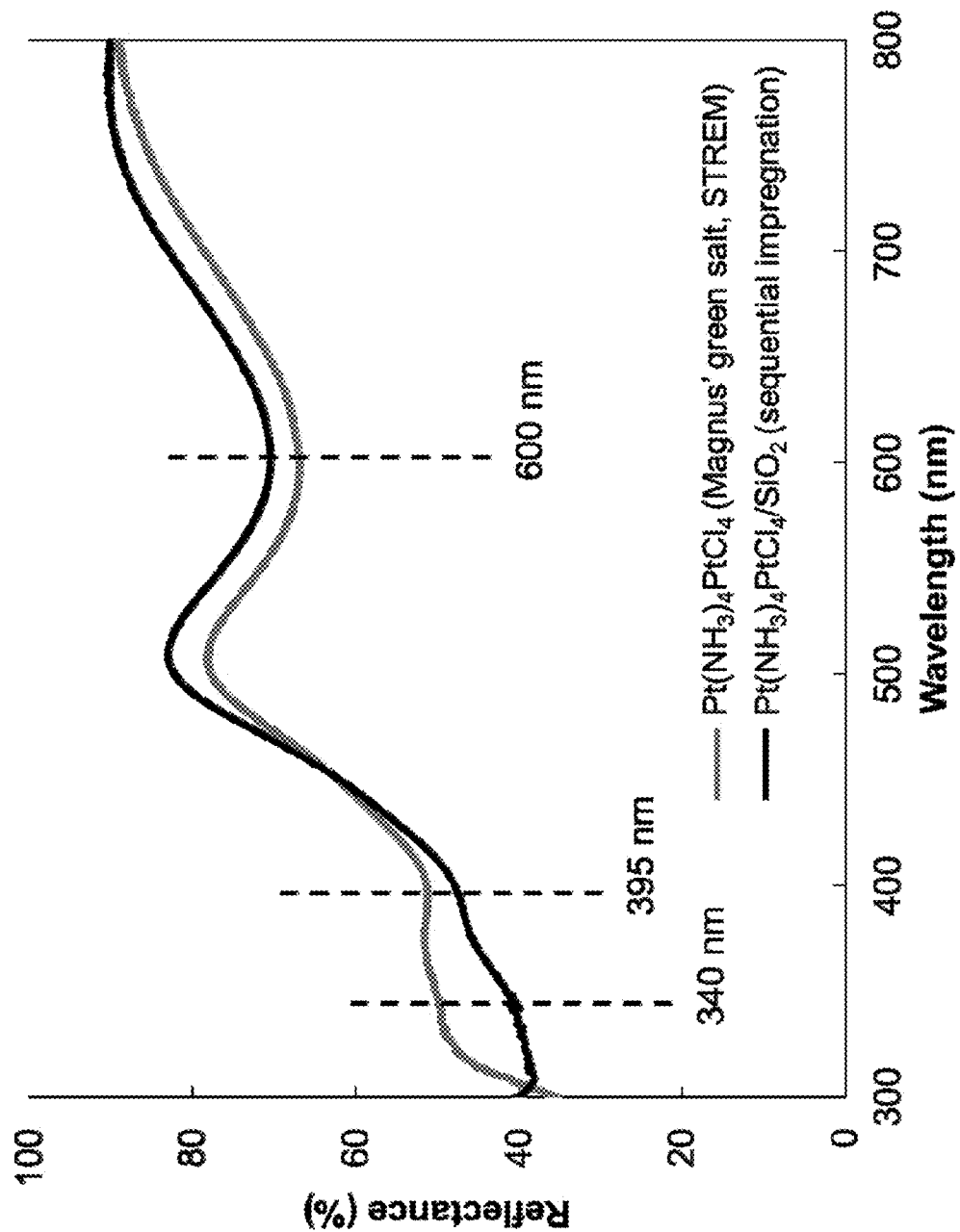
FIG. 21 depicts the UV-Vis diffuse reflectance spectra of commercial [Pt(NH$_3$)$_4$][PtCl$_4$] and [Pt(NH$_3$)$_4$][PtCl$_4$]/$SiO_2$ synthesized by sequential impregnation. The three absorption bands associated with the metallophilic interaction between adjacent Pt metal centers in the Magnus' green salt are marked by dashed lines.

The metallophilic interaction between the adsorbed complex metal cations and anions was confirmed by UV-Vis diffuse reflectance spectroscopy, indicating the formation of supported DCSs. DCSs usually exhibit distinct colors originating from their metal-metal interactions. In fact, many DCSs are named after their colors, e.g. Magnus' green salt [Pt(NH$_3$)$_4$][PtCl$_4$], Vauquelin's pink salt [Pd(NH$_3$)$_4$][PdCl4] (Bremi et al., Chem. Mater., 1999, 11, 977-994). Because of the relatively low loadings, the supported complex species obtained by this sequential electrostatic adsorption approach do not exhibit noticeable colors. UV-Vis diffuse reflectance spectroscopy was employed here to study the electronic structure of these supported species. The spectra of commercial Magnus' green salt was compared to [Pt(NH$_3$)$_4$][PtCl$_4$]/SiO$_2$ synthesized by a sequential impregnation method. Both samples show absorption bands at 340 nm, 395 nm, and 600 nm (FIG. 21), which are consistent with literature data (Miller, J. Chem. Soc., 1965, 0, 713-720). This allows for the use of the silica-supported DCSs synthesized by sequential impregnation as references for UV-Vis studies. The supported [Pd(NH$_3$)$_4$][PtCl$_4$]/SiO$_2$ synthesized by sequential electrostatic adsorption shows identical absorption bands (390 nm and 535 nm) with the reference synthesized by sequential impregnation (FIG. 20). These bands are consistent with that reported for bulk DCS [Pd(NH$_3$)$_4$][PtCl$_4$], which exhibits a pink color (Miller, J. Chem. Soc., 1965, 0, 713-720). In contrast, the UV-Vis spectra of the impregnated Pd(NH$_3$)$_4$Cl$_2$/SiO$_2$ and K$_2$PtCl$_4$/SiO$_2$ differ from the spectra of [Pd(NH$_3$)$_4$][PtCl$_4$]/SiO$_2$.

Figure 13:
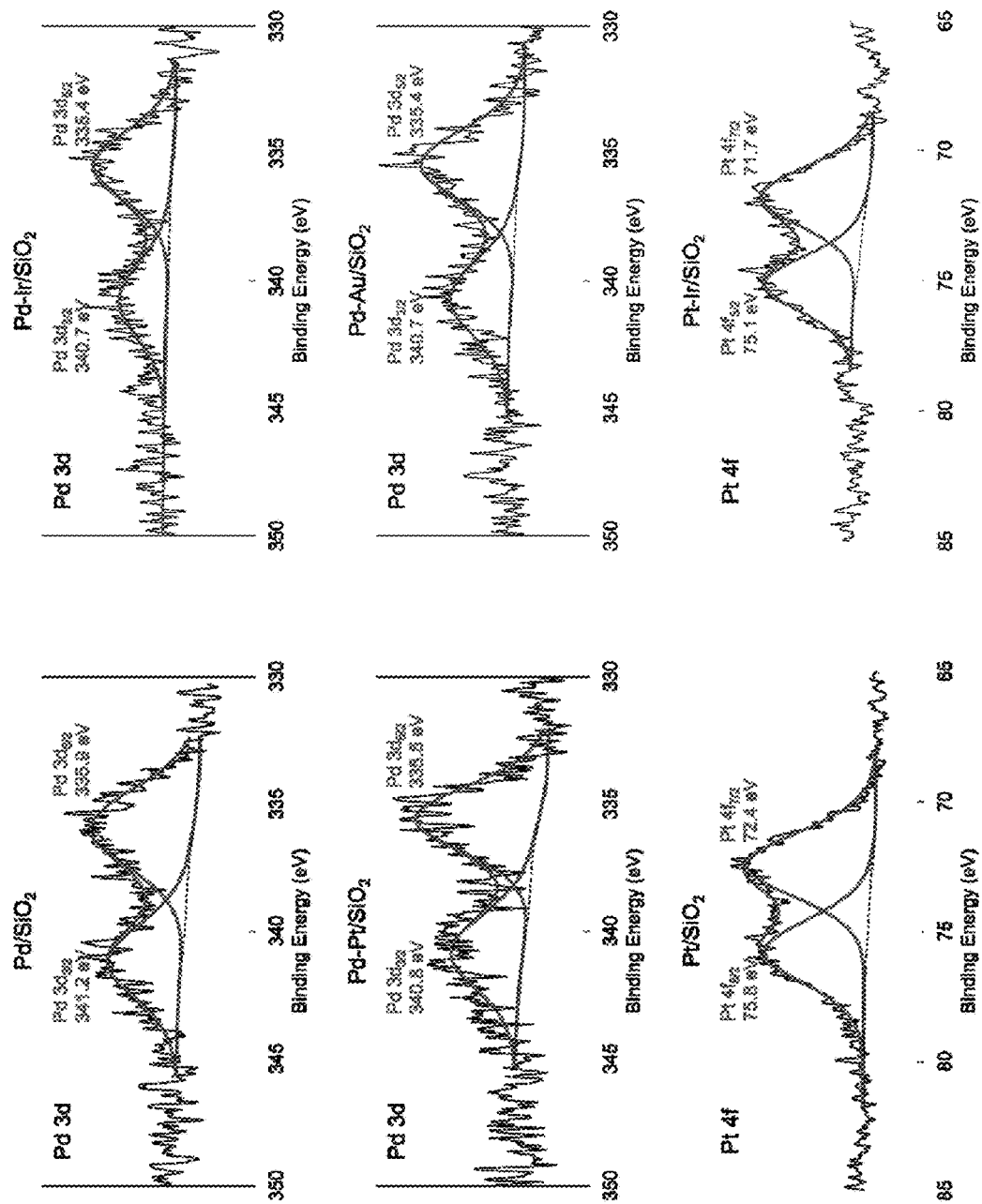
FIG. 13 depicts XPS results for the reduced metals derived from supported complex metal cations and complex metal cations in the supported DCSs after reduction at 400° C.
Figure 14:
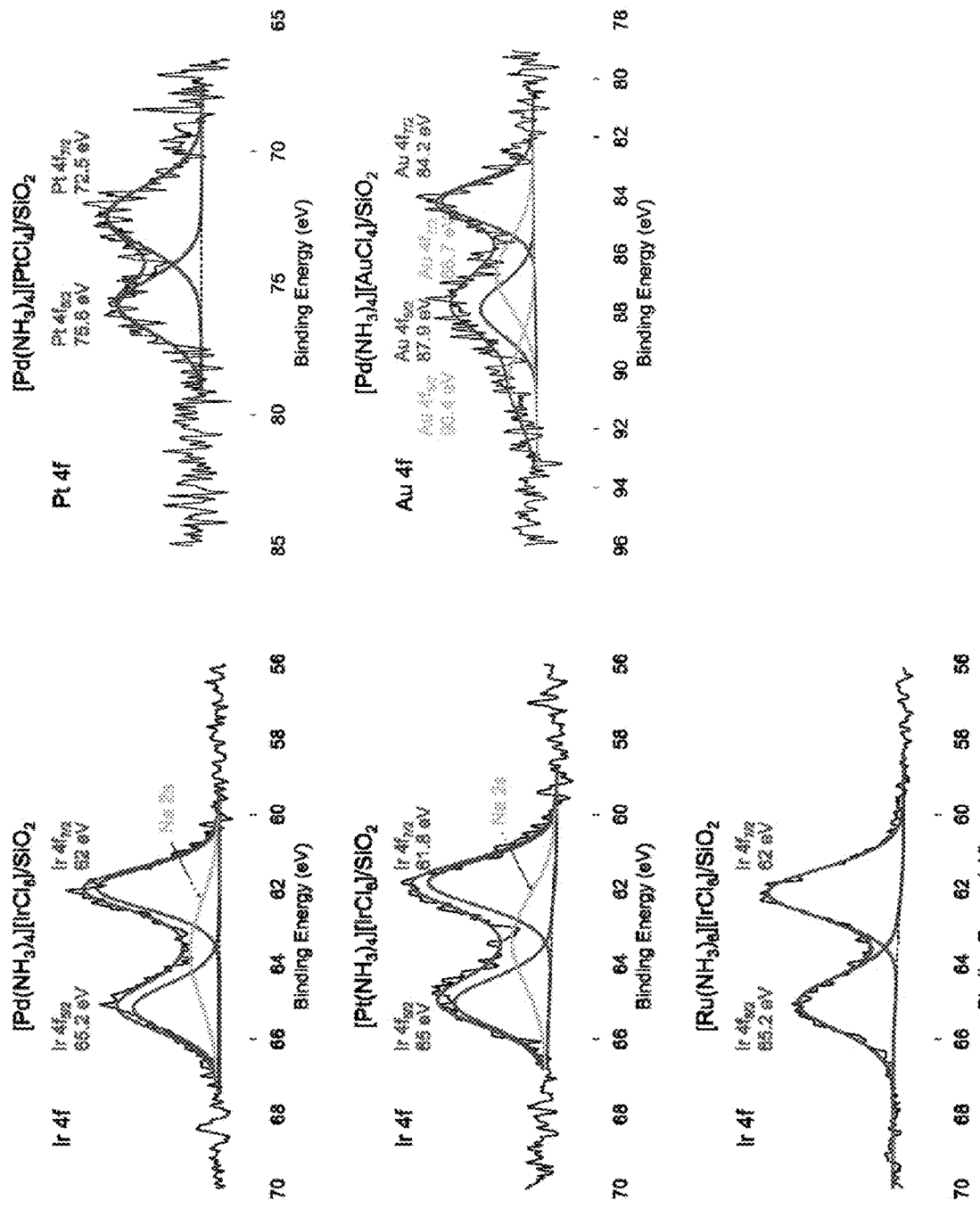
FIG. 14 depicts XPS results for the complex metal anions in the nonreduced supported DCSs prior to reduction at 400° C.
Figure 17:
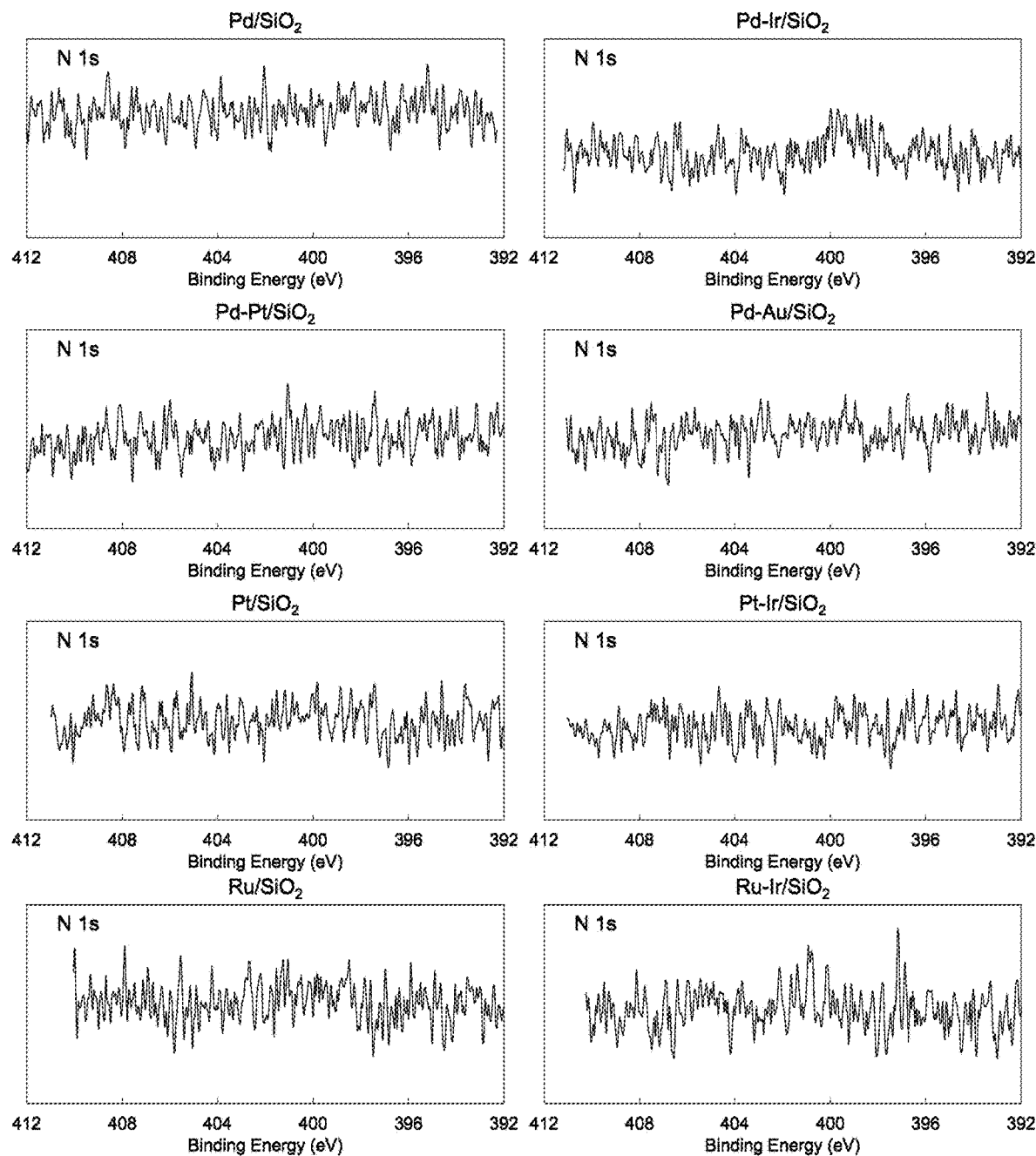
FIG. 17 depicts N is XPS results for the reduced supported complex metal cations and supported DCSs after reduction at 400° C.
Figure 18:
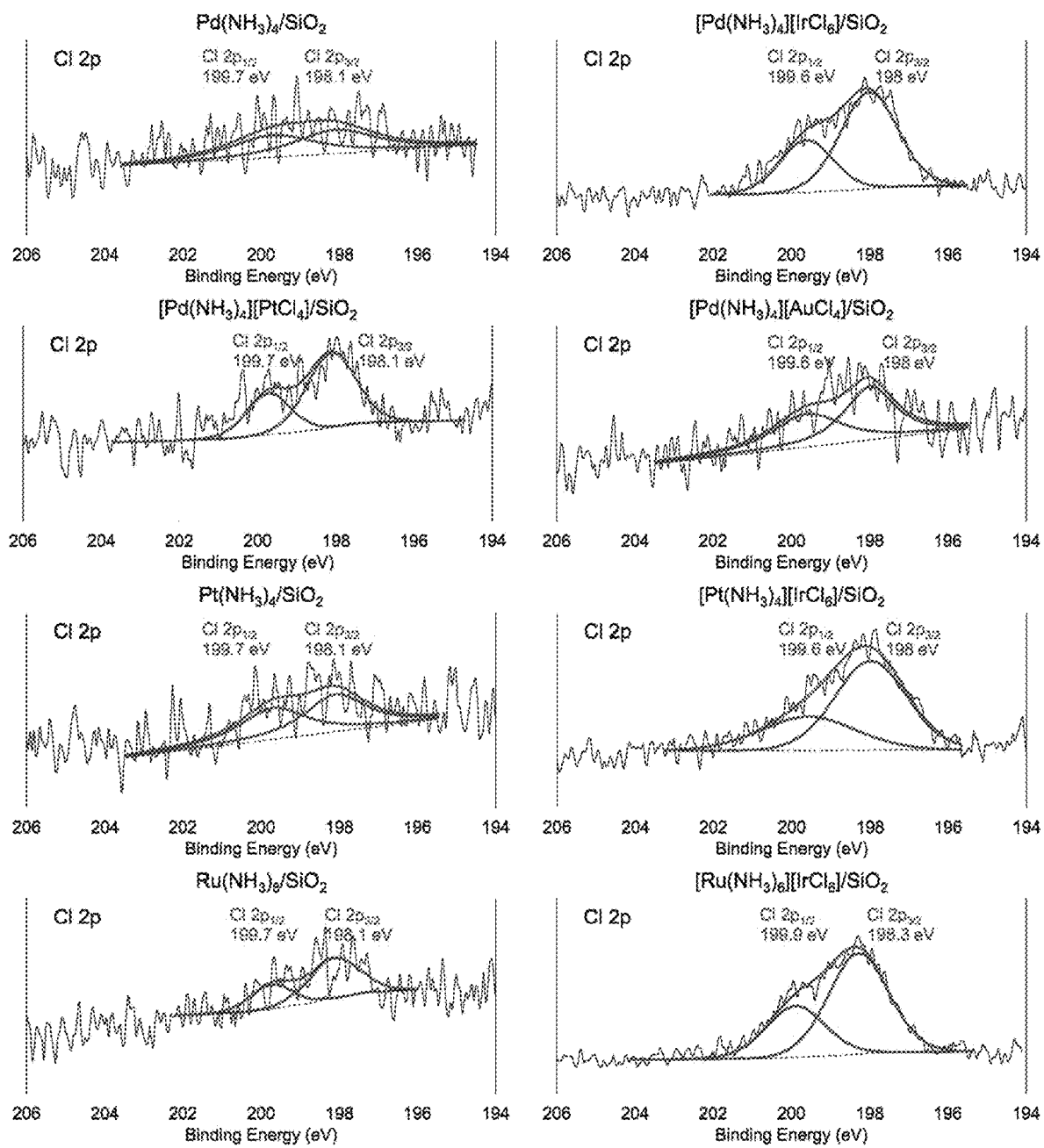
FIG. 18 depicts Cl 2p XPS results for the nonreduced supported complex metal cations and supported DCSs prior to reduction at 400° C.
Figure 22:
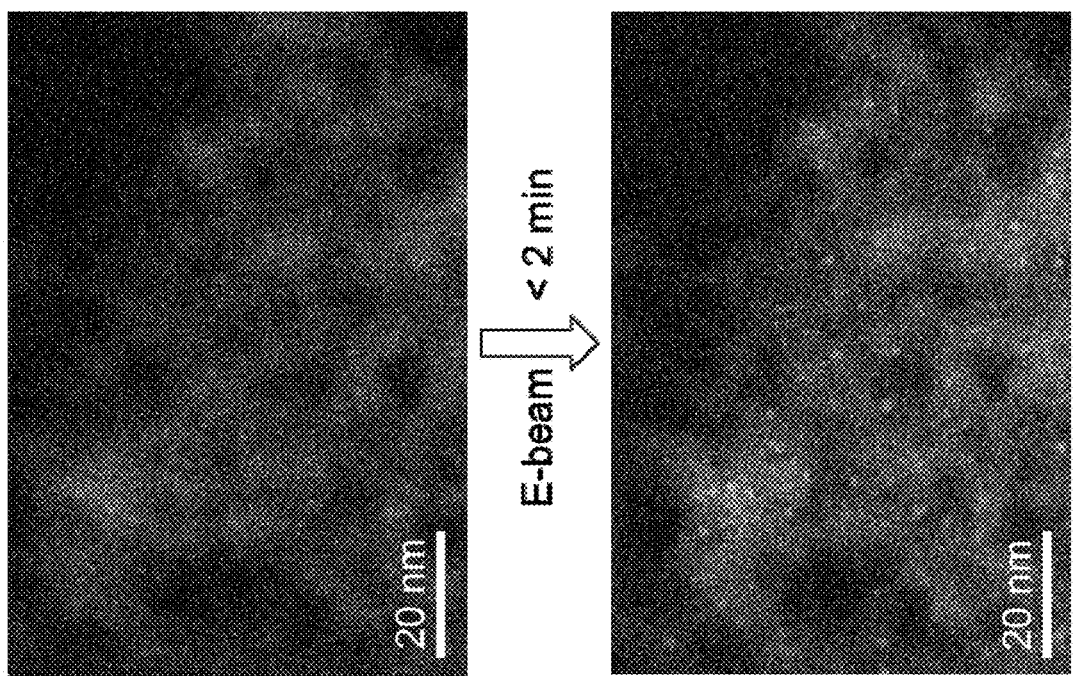
FIG. 22 shows the structural evolution of supported DCSs upon reduction. Electron-beam exposure effects in situ DCS decomposition to 1-2 nm NPs.
Figure 23:
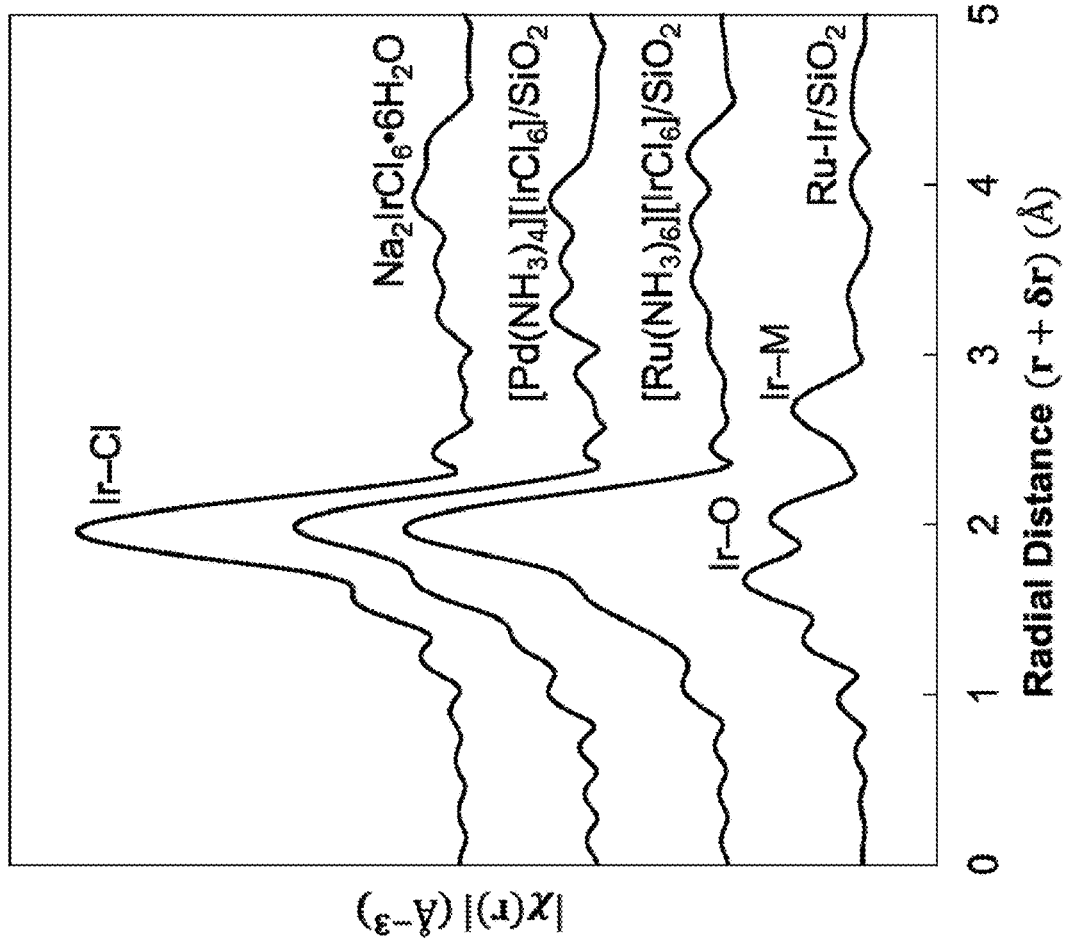
FIG. 23 depicts Fourier transforms of EXAFS spectra of various Ir-containing samples at the Ir $L_{III}$-edge: Na$_2$IrCl$_6$·6H$_2$O reference; nonreduced [Ru(NH$_3$)$_6$][IrCl$_6$]/$SiO_2$ and [Pd(NH$_3$)$_4$][IrCl$_6$]/$SiO_2$, and reduced Ru—Ir/$SiO_2$ synthesized by sequential electrostatic adsorption.

The amorphous nature of supported DCSs was confirmed by electron microscopy studies. No NPs were observed on the supported DCSs initially (FIG. 22). However, within two minutes of electron beam exposure, a number of 1-2 nm-sized NPs evolved, indicating the occurrence of in situ decomposition of DCSs associated with electron beam damage. Extended X-ray absorption fine structure (EXAFS) measurements of Ir L$_{III}$-edge were performed in order to study the structural evolution of coordination sphere of Ir atoms. As shown in FIG. 23, the EXAFS spectra of nonreduced [Ru(NH$_3$)$_6$][IrCl$_6$]/SiO$_2$ and [Pd(NH$_3$)$_4$][IrCl$_6$]/SiO$_2$ are similar to that of the Na$_2$IrCl$_6$.6H$_2$O reference. The major peak between 1.5-2.5 Å is associated with the Ir—Cl bond in IrCl$_6$$^{2-}$. After the reduction of [Ru(NH$_3$)$_6$][IrCl$_6$]/SiO$_2$ at 400° C. under a hydrogen atmosphere, a new peak appeared between 2.5-3 Å, which belongs to Ir-M (M=Ru or Ir) bonds. XPS analysis of the reduced DCS/SiO$_2$ samples confirms the reduction of metal atoms into metallic states (FIGS. 13 and 15). Furthermore, the disappearance of N is and Cl 2p signals indicates the successful removal of ligands (FIGS. 17 and 19).

Figure 24A:
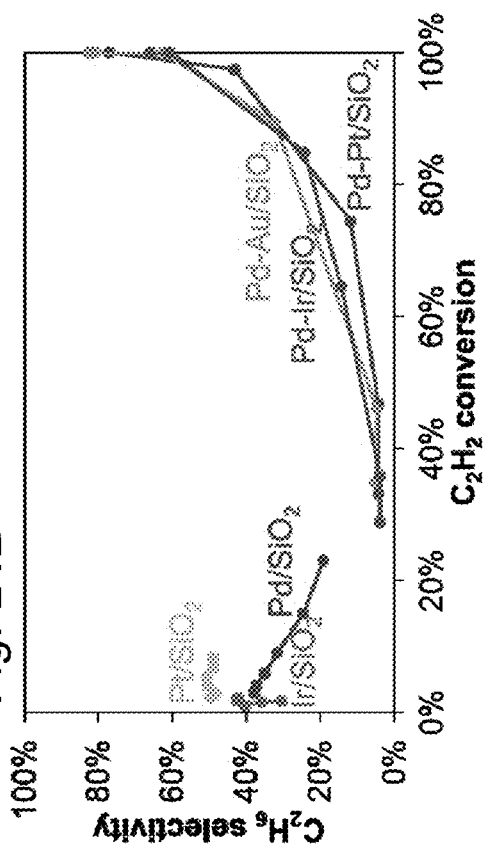
FIG. 24A to 24D depict the catalytic performance of supported monometallic and bimetallic NPs in acetylene hydrogenation and IR spectroscopic study using CO as a probe molecule. All catalysts were reduced at 400° C.
Figure 24B:
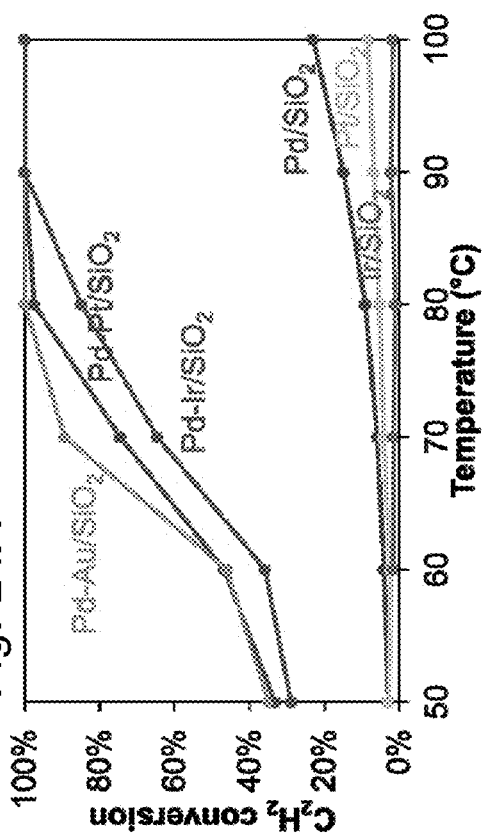
Figure 24D:
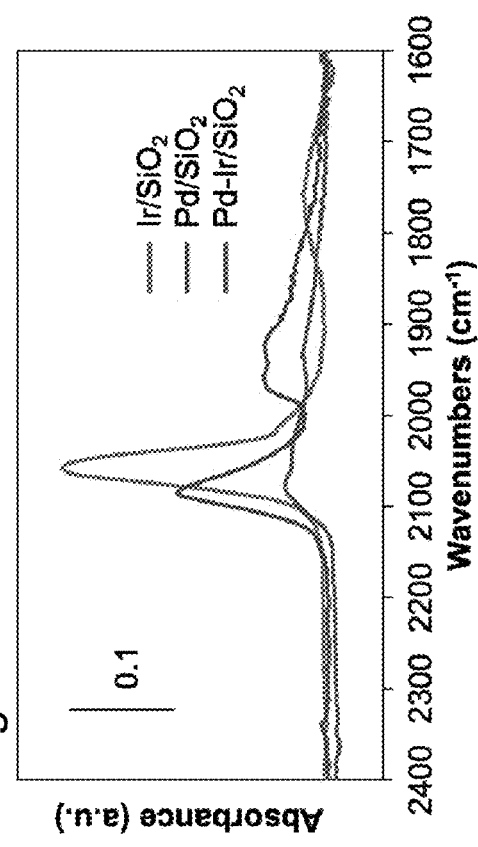
Figure 24C:
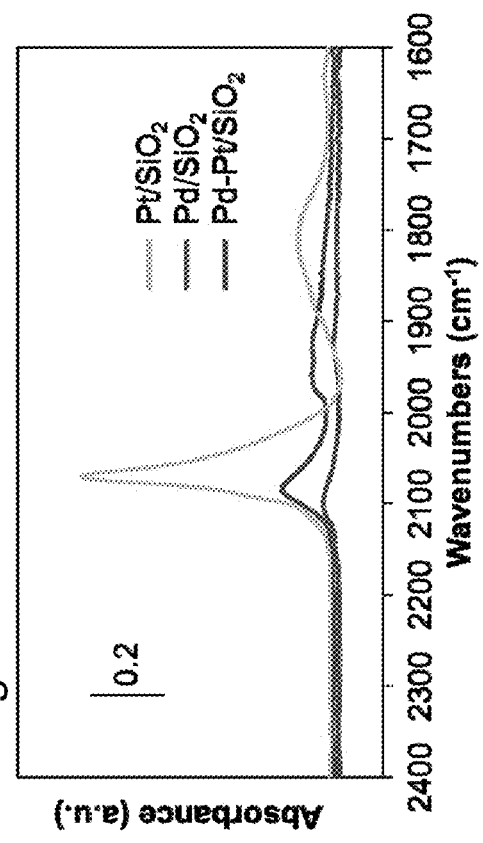
Figure 25:
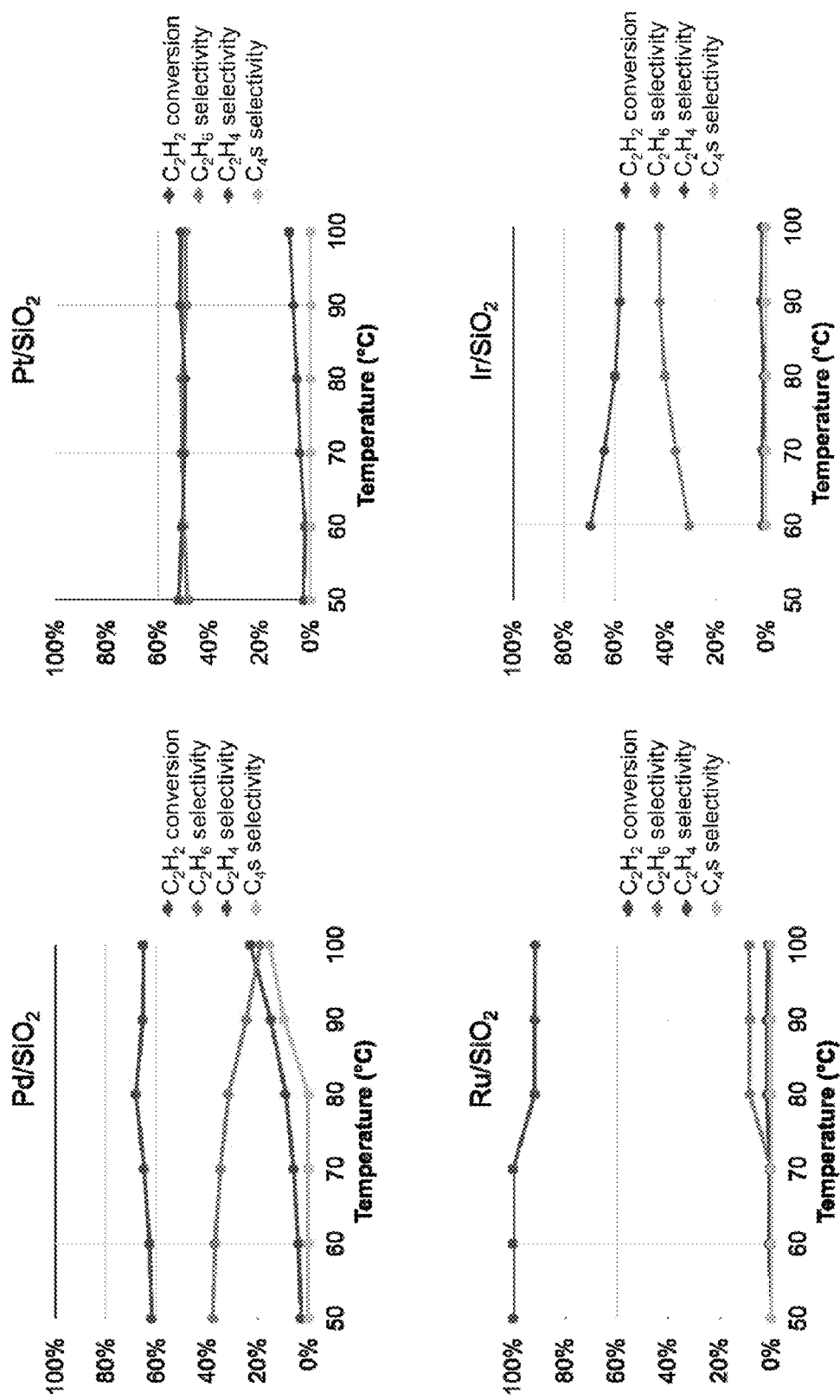
FIG. 25 shows plots of temperature-dependent acetylene hydrogenation conversion and selectivity over monometallic catalysts synthesized by electrostatic adsorption. The metal loadings are approximately 1 wt. %, 2 wt. %, 1 wt. %, and 2 wt. % for Pd/$SiO_2$, Pt/$SiO_2$, Ru/$SiO_2$, and Ir/$SiO_2$, respectively.
Figure 26:
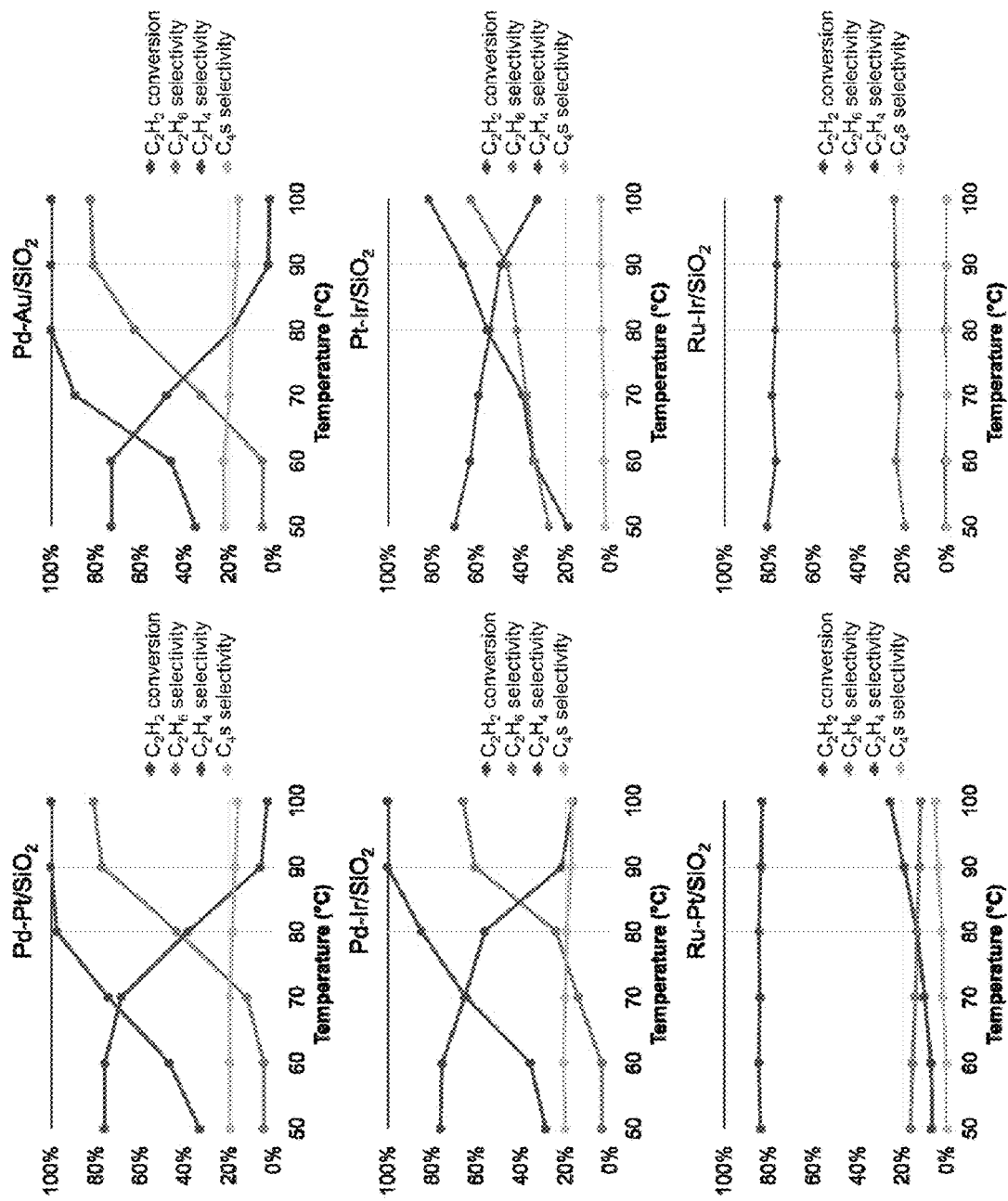
FIG. 26 shows plots of temperature-dependent acetylene hydrogenation conversion and selectivity over bimetallic catalysts synthesized by sequential electrostatic adsorption. The metal loadings are approximately 1 wt. %-2 wt. % (Pd—Pt/$SiO_2$), 1 wt. %-2 wt. % (Pd—Au/$SiO_2$), 1 wt. %-2 wt. % (Pd—Ir/$SiO_2$), 2 wt. %-2 wt. % (Pt—Ir/$SiO_2$), 1 wt. %-2 wt. % (Ru—Pt/$SiO_2$), and 1 wt. %-2 wt. % (Ru—Ir/$SiO_2$).

The catalytic performance of the supported bimetallic NPs was evaluated in acetylene hydrogenation. The temperature-dependent acetylene conversion and ethane selectivity are shown in FIGS. 24A and 24B. Catalytic results of each individual catalyst are plotted in FIGS. 25 and 26. The bimetallic catalysts (Pd—Ir/SiO$_2$, Pd—Pt/SiO$_2$, Pd—Au/SiO$_2$, Pt—Ir/SiO$_2$, and Ru—Pt/SiO$_2$) generally show higher catalytic activity and lower ethane selectivity compared to their parent metals. Ru—Ir/SiO$_2$ is an exception, which shows negligible activity, similar to its parent metals. Among the group VIII metals, Ru and Ir often show the strongest binding strengths for many types of adsorbates (Abild-Pedersen et al., Phys. Rev. Lett., 2007, 99, 016105). This might explain the low activity of Ru/SiO$_2$, Ir/SiO$_2$, and Ru—Ir/SiO$_2$ in acetylene hydrogenation. The enhanced activity and suppressed ethane selectivity of bimetallic Pd-M/SiO$_2$ and Pt-M/SiO$_2$ compared to their parent metals might be partly attributed to the relatively weaker binding strengths of acetylene and ethylene on these bimetallic NPs (Kyriakou et al., Science, 2012, 335, 1209-1212; Studt et al., Science, 2008, 320, 1320-1322). Infrared spectroscopic study of these catalysts using CO as a probe molecule was performed to quantify ligand binding to the inventive bimetallic nanoparticles. Compared to the monometallic catalysts, the intensity of CO bands of the bimetallic catalysts decrease dramatically (FIGS. 24C and 24D). These results suggest a much weaker adsorption of CO on these bimetallic NPs, in concert with the trend of acetylene hydrogenation performance.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

We claim:

1. A method of fabricating multimetallic nanoparticles, the method comprising:
    providing a substrate;
    activating the substrate surface;
    adsorbing a cationic transition metal complex onto the substrate surface to form a substrate-supported cationic transition metal complex;
    adsorbing an anionic transition metal complex onto the substrate-supported cationic transition metal complex to form a substrate-supported multimetallic complex salt; and
    reducing the substrate-supported multimetallic complex salt to provide a plurality of multimetallic nanoparticles.

2. The method of claim 1, wherein the step of activating the substrate surface comprises the step of treating the substrate surface with a base.

3. The method of claim 1, wherein the substrate has a specific surface area above about 500 $m^2/g$.

4. The method of claim 1, wherein the charge of the cationic transition metal complex is an integer value between +2 and +4.

5. The method of claim 1, wherein the cationic transition metal complex is a polyammine complex.

6. The method of claim 1, wherein the step of adsorbing a cationic transition metal complex onto the substrate surface comprises the step adding an aqueous solution comprising the cationic transition metal complex to an aqueous suspension comprising the substrate.

7. The method of claim 1, wherein the anionic transition metal complex is selected from the group consisting of $Na_2PtCl_4$, $K_2PtCl_4$, $Na_2IrCl_6$, $K_2IrCl_6$, $NaAuCl_4$, and $KAuCl_4$.

8. The method of claim 1, wherein the molar ratio of cationic transition metal complex to anionic transition metal complex is about 1:1.

9. The method of claim 1, wherein the step of adsorbing an anionic transition metal complex onto the substrate-supported cationic transition metal complex further comprises the steps of:
    preparing an aqueous solution of the anionic transition metal complex;
    adding a phase transfer agent to the aqueous solution;
    adding an aprotic solvent to the aqueous solution to form a biphasic mixture;
    separating the aprotic solvent from the biphasic mixture; and
    adding the aprotic solvent to a suspension of the substrate-supported cationic transition metal complex in an aprotic solvent.

10. The method of claim 9, wherein the aprotic solvent is selected from the group consisting of a chlorinated solvent, an aromatic solvent, and an aliphatic solvent.

11. The method of claim 9, wherein the phase transfer agent is a quaternary ammonium salt or a crown ether.

12. The method of claim 1, wherein the step of adsorbing an anionic transition metal complex onto the substrate-supported cationic transition metal complex to form a substrate-supported multimetallic complex salt further comprises the step of:
    adsorbing a second cationic transition metal complex onto the anionic transition metal complex.

13. The method of claim 12, wherein the step of adsorbing a second cationic transition metal complex onto the anionic transition metal complex further comprises the steps of:
    exchanging at least one counterion of the second cationic transition metal complex with a non-coordinative anion; and
    adding the second cationic transition metal complex to a suspension of the substrate in an aprotic solvent.

14. The method of claim 1, wherein the step of reducing the substrate-supported multimetallic complex salt comprises the step of treating the substrate-supported multimetallic complex salt with an atmosphere comprising hydrogen gas at a temperature of about 400° C.

* * * * *